(12) United States Patent
Pennington

(10) Patent No.: US 8,734,709 B2
(45) Date of Patent: May 27, 2014

(54) APPARATUS FOR REFORMING A PORTION OF A PLASTIC CONTAINER

(75) Inventor: Garrett R. Pennington, Manheim, PA (US)

(73) Assignee: Graham Packaging Company, L.P., York, PA (US)

(*) Notice: Subject to any disclaimer, the term of this patent is extended or adjusted under 35 U.S.C. 154(b) by 1043 days.

(21) Appl. No.: 12/754,647

(22) Filed: Apr. 6, 2010

(65) Prior Publication Data

US 2010/0252952 A1 Oct. 7, 2010

Related U.S. Application Data

(60) Provisional application No. 61/167,344, filed on Apr. 7, 2009, provisional application No. 61/256,581, filed on Oct. 30, 2009.

(51) Int. Cl.
*B29C 49/64* (2006.01)

(52) U.S. Cl.
USPC .............. 264/521; 264/339; 264/503; 29/453

(58) Field of Classification Search
USPC .............. 264/219, 515, 171.27, 293, 173.16, 264/540; 425/182, 384, 392, 462, 532; 29/453
See application file for complete search history.

(56) References Cited

U.S. PATENT DOCUMENTS

| | | |
|---|---|---|
| 2,266,417 A | 12/1939 | Eisler |
| 2,475,915 A | 4/1944 | Orr |
| 2,454,910 A | 4/1946 | Carr |
| 3,173,174 A | 3/1965 | Edwards |
| 3,195,450 A | 7/1965 | Sciame |
| 3,354,509 A | 11/1967 | Ammondson |
| 3,418,409 A | 12/1968 | Hesse |
| 3,432,586 A | 3/1969 | Stenger |
| 3,456,290 A | 7/1969 | Ruekberg |

(Continued)

FOREIGN PATENT DOCUMENTS

| | | |
|---|---|---|
| EP | 0057504 | 8/1982 |
| EP | 0381322 | 12/1990 |

(Continued)

OTHER PUBLICATIONS

Blow Molding Handbook, Edited by Donald V. Rosato, PhD and Dominick V. Rosato PE, 1989, pp. 7, 8, 15 and 34.

(Continued)

*Primary Examiner* — Minh Trinh
(74) *Attorney, Agent, or Firm* — Stradley Ronon Stevens & Young, LLP

(57) ABSTRACT

An apparatus for converting a refurbishing machine into a reforming machine. The apparatus reforms a portion of a plastic container using induction heating. The apparatus includes a reform heating assembly that achieves a temperature of above about 500° F., heats the container via radiant and convection heating without contacting the container, and has a power and thermocouple connection to a first controller. The apparatus also includes a reform cooling assembly that has a forming die which contacts and reforms the container portion, a support housing a Peltier thermoelectric cooler, a heat sink facilitating heat transfer away from the forming die, and a power and thermocouple connection to a second controller. The method includes the steps of replacing heating assemblies of the refurbishing machine with the reform heating assembly and the reform cooling assembly, respectively, using the existing equipment utilities of the refurbishing machine.

23 Claims, 18 Drawing Sheets

(56) References Cited

U.S. PATENT DOCUMENTS

| | | | |
|---|---|---|---|
| 3,457,590 | A | 7/1969 | Dittmann |
| 3,464,582 | A | 9/1969 | Greitzer et al. |
| 3,540,371 | A | 11/1970 | Rome et al. |
| 3,790,087 | A | 2/1974 | Banyas et al. |
| 3,846,531 | A | 11/1974 | Reilly |
| 3,862,698 | A | 1/1975 | Hafele |
| 3,874,830 | A | 4/1975 | Carter et al. |
| 3,947,204 | A | 3/1976 | Ayres et al. |
| 3,969,455 | A | 7/1976 | Moller |
| 4,034,036 | A | 7/1977 | Farrell |
| 4,051,754 | A | 10/1977 | Harcuba et al. |
| 4,061,702 | A | 12/1977 | Kessler |
| 4,103,411 | A | 8/1978 | Gottsegen |
| 4,151,024 | A | 4/1979 | Ohlsson |
| 4,179,252 | A | 12/1979 | Seufert |
| 4,297,306 | A | 10/1981 | Yoshino et al. |
| 4,323,411 | A | 4/1982 | Uhlig |
| 4,324,601 | A | 4/1982 | Dembicki et al. |
| 4,379,099 | A | 4/1983 | Ota et al. |
| 4,450,765 | A | 5/1984 | Van Steenkiste |
| 4,497,622 | A | 2/1985 | Grebowiec |
| 4,497,758 | A | 2/1985 | Clark |
| 4,522,770 | A | 6/1985 | Andersen |
| 4,650,628 | A | 3/1987 | Evely |
| 4,696,636 | A | 9/1987 | Evely |
| 4,701,295 | A | 10/1987 | Kato et al. |
| 4,717,522 | A | 1/1988 | Evely |
| 4,717,523 | A | 1/1988 | Evely |
| 4,856,667 | A | 8/1989 | Thompson |
| 4,928,835 | A | 5/1990 | Collette et al. |
| 4,954,310 | A | 9/1990 | Andersen |
| 4,968,242 | A | 11/1990 | Andersen |
| 5,045,255 | A | 9/1991 | Kurz |
| 5,067,888 | A | 11/1991 | Torsten |
| 5,115,938 | A | 5/1992 | Thompson |
| 5,200,587 | A | 4/1993 | Fang |
| 5,215,694 | A | 6/1993 | Bartimes et al. |
| 5,238,642 | A | 8/1993 | Benquet et al. |
| 5,259,858 | A | 11/1993 | Inao et al. |
| 5,429,777 | A | 7/1995 | Nilsson |
| 5,431,291 | A | 7/1995 | LaBombarbe, Jr. |
| 5,441,675 | A | 8/1995 | Souders |
| 5,467,628 | A | 11/1995 | Bowlin et al. |
| 5,582,957 | A | 12/1996 | Sirianni et al. |
| 5,667,748 | A * | 9/1997 | Ohta et al. ............... 264/515 |
| 5,807,592 | A | 9/1998 | Alieri |
| 5,827,467 | A | 10/1998 | Ruppert et al. |
| 5,879,723 | A | 3/1999 | Stachowiak |
| 5,980,811 | A | 11/1999 | Towns |
| 5,989,665 | A | 11/1999 | Connell et al. |
| 6,003,699 | A | 12/1999 | Laszlo et al. |
| 6,062,408 | A | 5/2000 | Beck et al. |
| 6,113,840 | A | 9/2000 | Emmer et al. |
| 6,126,886 | A | 10/2000 | Beck et al. |
| 6,187,399 | B1 | 2/2001 | Sandor et al. |
| 6,237,791 | B1 | 5/2001 | Beck et al. |
| 6,241,111 | B1 | 6/2001 | Sandor et al. |
| 6,315,967 | B1 | 11/2001 | Potter et al. |
| 6,361,640 | B1 | 3/2002 | Kamen et al. |
| 6,361,842 | B1 | 3/2002 | Stachowiak |
| 6,434,812 | B1 | 8/2002 | Andersson et al. |
| 6,530,301 | B1 | 3/2003 | Seitz et al. |
| 6,536,616 | B2 | 3/2003 | Sandor et al. |
| 6,555,033 | B2 | 4/2003 | Cargile et al. |
| 6,629,834 | B2 | 10/2003 | Cargile et al. |
| 6,675,680 | B1 | 1/2004 | Seitz et al. |
| 6,730,261 | B2 * | 5/2004 | Ogawa ............... 264/536 |
| 6,789,398 | B1 | 9/2004 | Daoud et al. |
| 6,855,289 | B2 | 2/2005 | Krishnakumar et al. |
| 7,147,451 | B2 | 12/2006 | Johnson |
| 7,393,495 | B2 * | 7/2008 | Grinnall et al. ............... 264/534 |
| 7,435,073 | B2 | 10/2008 | Chisholm et al. |
| 7,637,733 | B2 | 12/2009 | O'Connell et al. |
| 7,924,421 | B2 * | 4/2011 | Schmidt et al. ............ 356/239.4 |
| 2003/0042649 | A1 | 3/2003 | Bernard |
| 2005/0068182 | A1 | 3/2005 | Dunlap et al. |
| 2005/0269744 | A1 | 12/2005 | Lonsway |
| 2005/0280542 | A1 | 12/2005 | Shieh |
| 2006/0119004 | A1 | 6/2006 | Chmura et al. |
| 2006/0127618 | A1 | 6/2006 | O'Connell et al. |
| 2007/0126152 | A1 | 6/2007 | Chisholm |
| 2007/0139202 | A1 | 6/2007 | Austin |
| 2008/0054524 | A1 | 3/2008 | Chisholm et al. |
| 2008/0054526 | A1 | 3/2008 | Barker et al. |
| 2010/0000959 | A1 | 1/2010 | O'Connell et al. |
| 2010/0252952 | A1 * | 10/2010 | Pennington ............... 264/219 |
| 2011/0315592 | A1 * | 12/2011 | Pennington et al. ....... 206/524.6 |

FOREIGN PATENT DOCUMENTS

| | | |
|---|---|---|
| EP | 1230905 | 8/2002 |
| GB | 1010603 | 11/1965 |
| GB | 1346681 | 2/1974 |
| GB | 2015914 | 9/1979 |
| GB | 2092567 | 8/1982 |
| GB | 2187129 | 9/1987 |
| JP | 61116513 | 6/1986 |
| JP | 2011138388 | 5/2001 |
| MX | 2007001652 | 7/2007 |
| NL | 8203001 | 7/1983 |
| NL | 8901766 | 2/1991 |
| WO | 2006020761 | 2/2006 |
| WO | 2006060350 | 6/2006 |
| WO | 2007095086 | 8/2007 |
| WO | 2008027729 | 3/2008 |
| WO | 2010118014 | 10/2010 |

OTHER PUBLICATIONS

EPO International Search Report mailed Dec. 6, 2010 for International Application No. PCT/US2010/030082.
Fundamentals of Manufacturing, 2nd Edition, Society of Manufacturing Engineers, 2002, p. 230.
PCT/US2005/028538—International Search Report and Written Opinion mailed Dec. 15, 2005.
PCT/US2005/043022—International Preliminary Report on Patentability issued Jun. 5, 2007.
PCT/US2005/043022—International Search Report and Written Opinion mailed May 4, 2006.
PCT/US2005/028538—International Preliminary Report on Patentability issued Jul. 5, 2006.
PCT/US2007/003467 International Preliminary Report on Patentability issued Aug. 12, 2008.
PCT/US2007/003467 International Search Report and Written Opinion issued Jul. 31, 2007.
PCT/US2007/076060—International Preliminary Report on Patentability issued Mar. 3, 2009.
PCT/US2007/076060—International Search Report and Written Opinion mailed Oct. 3, 2008.
PCT/US2010/030082—International Preliminary Report on Patentability issued Oct. 11, 2011.
Plastics Processing Technology, Edward A. Muccio, 1994, pp. 124-125.
Understanding Blow Molding 2nd Edition, Norman C. Lee, 2007, pp. 13 and 34.
The American Heritage Dictionary of the English Language, 3rd Edition, 1996, p. 1518, see "reform" and "re-form".
Patent Abstracts of Japan vol. 2000, No. 22, Mar. 9, 2001 & JP 2001138388A (Kuroda Plastic Kogyo KK) May 22, 2001.

* cited by examiner

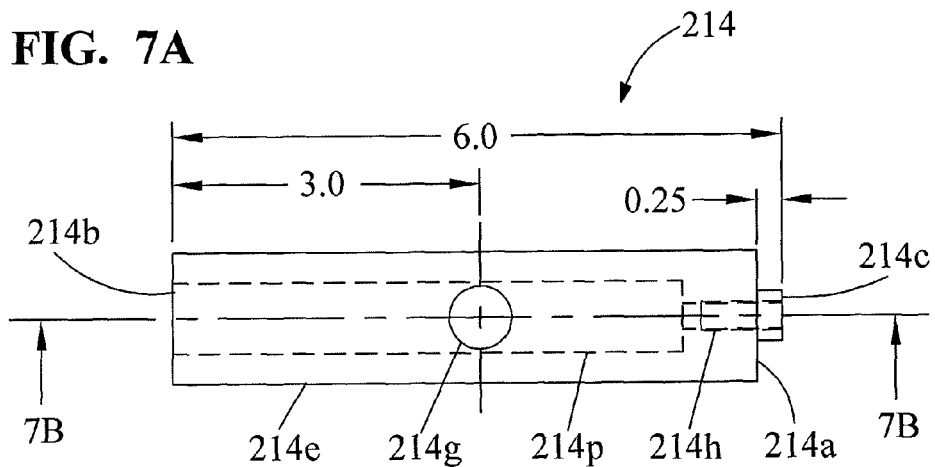
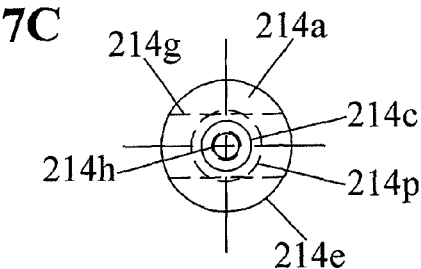
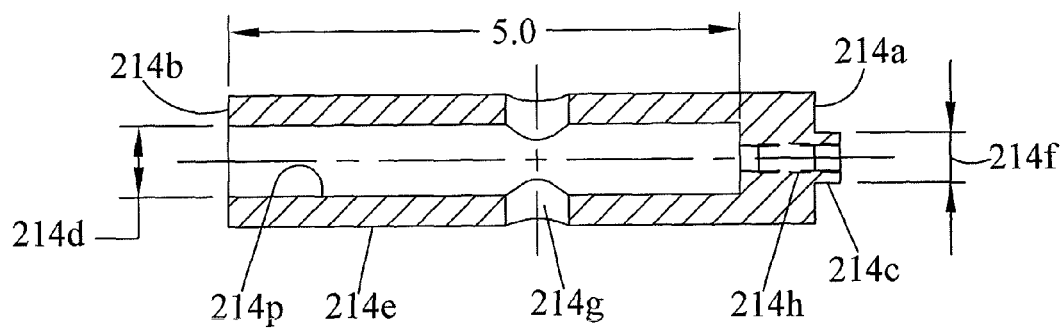

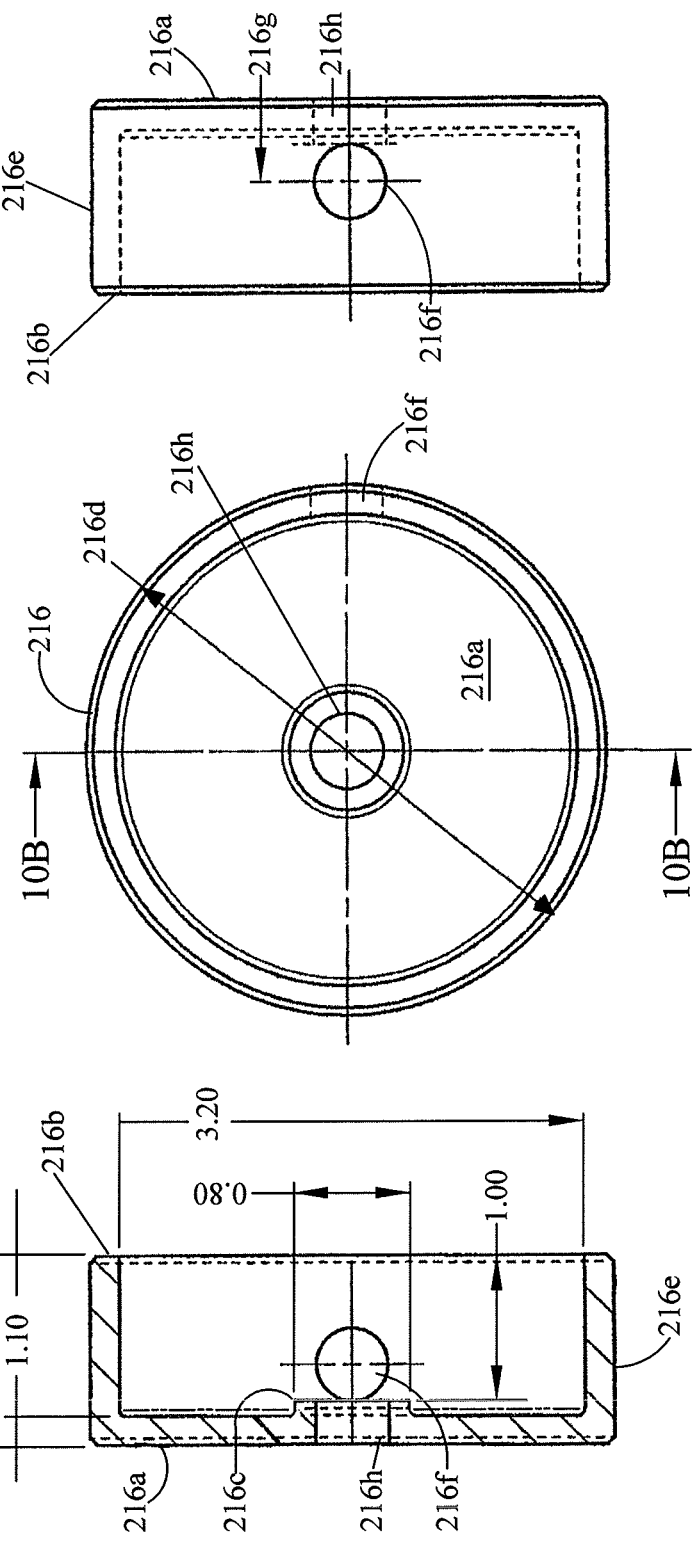

APPARATUS FOR REFORMING A PORTION OF A PLASTIC CONTAINER

RELATED APPLICATIONS

This application claims the benefit of priority to U.S. Provisional Patent Application Ser. No. 61/167,344, filed on Apr. 7, 2009, and to U.S. Provisional Patent Application Ser. No. 61/256,581, filed on Oct. 30, 2009. The contents of both of these priority applications are incorporated in this application by reference.

TECHNICAL FIELD

The present invention relates generally to plastic containers and, more specifically, to an apparatus for reforming a portion of a plastic container (and, most specifically, a blow-molded plastic container) using retrofit finishing (or burnishing) machinery.

BACKGROUND OF THE INVENTION

Capping processes for plastic containers typically require the upper portion of the container, such as the neck finish, to meet exacting dimensional tolerances. To achieve the necessary tolerances, the upper portions of the containers are usually produced using injection molding processes, for example, by injection blow molding the containers. Injection blow molding processes are at a significant output-to-cavity disadvantage, however, when compared to other types of blow molding, such as extrusion blow molding. In addition, injection blow molding often requires expensive injection manifolds and involves sensitive injection processes.

According to another method of making containers, a preform with a pre-configured upper portion (e.g., neck finish) is made by injection molding. Subsequently, a container is blow molded from the lower portion of the preform. The upper portion can become distorted during blow molding, however, due to the heat applied to the preform. This can cause the pre-configured upper portion to fall out of tolerance.

The process of extrusion blow molding plastic containers typically involves the steps of extruding a tube of monolayer or multilayer plastic material, capturing the tube between opposed mold sections, blowing the tube to the contours of the mold cavity, opening the mold, removing the container, and trimming the end of the container neck finish. This trimming operation can involve removal of a flash or moil from the neck finish. The trimmed material may be scrapped or, alternatively, recycled as process regrind.

In another exemplary extrusion blow molding operation, the trimming operation can involve separation of two containers that are molded end-to-end. In either case, the trimming operation can leave an uneven end surface for later sealing engagement with a container closure. Furthermore, the end surface of the container neck finish may have mold parting line seams that can deleteriously affect sealing engagement with a container closure. These uneven or inconsistent end surface features can also affect induction sealing. Induction sealing can typically involve induction welding a metallic liner disk to a container end surface after filling the container to obtain a satisfactory container seal.

In order to address these disadvantages, it has been proposed to burnish the end surface of the container neck finish by contacting the neck finish end surface with a heated burnishing tool. Upon contacting the container neck finish end surface, the tool simultaneously heats the end portion of the neck finish to a particular softening temperature of the plastic material and modifies the end surface to eliminate mold parting line seams, uneven trim portions, and other post-molding imperfections. This process also has certain disadvantages.

For example, the heated plastic of the container neck finish may tend to stick to the heated burnishing tool. It is also difficult to control the temperature of the burnishing tool so as to obtain a desired temperature at the burnishing surface of the tool. Moreover, effective burnishing often requires that one of the container or the burnishing tool be rotated relative to the other to achieve a desired effect. Such rotation introduces additional process variables and, consequently, affects production speed. Thus, the tendency of the heated plastic to stick to the burnishing tool, in combination with the oft-required rotational step and difficulty of controlling the burnishing surface temperature of the tool, makes it difficult to determine and control the optimum tool-to-surface contact time (i.e., dwell time). The dwell time, during which the burnishing tool is in contact with the end portion of the neck finish, as well as additional process variables, should be minimized to achieve desired production speeds. Regardless, in many applications, burnishing is unable to manipulate sufficient plastic to achieve practical production cycle times.

Another proposed solution to the disadvantages outlined above is to reform the neck finish after the container is initially formed. In this solution, the container is heated to soften the portion of the container that requires reforming and then a relatively cold tool is brought into contact with the softened portion. Typically, heat is applied using infrared (IR) heat lamp tunnels or heater bands. IR radiation is electromagnetic radiation whose wavelength is longer than that of visible light (400-700 nm), but shorter than that of terahertz radiation (100 µm-1 mm) and microwaves (about 30,000 µm). Infrared radiation spans roughly three orders of magnitude (750 nm and 100 µm).

This IR-reforming process also has certain disadvantages. IR lamps generally only heat the top sealing surface (or TSS) of a container. This means the heat must migrate through the neck finish in order to shape the inner diameter of the neck. During this heating process, the neck finish becomes deformed and can yield containers that fall outside design specifications. It is possible to manufacture specifically shaped IR lamps (round, square, etc.) for localized heating. The disadvantage of doing this is cost; custom lamps are very expensive. Lamps are also delicate, which is a major concern in a production environment. A broken lamp will result in line down time due to replacement of the lamp, will require clean up of broken glass, and could prompt product recalls should glass contaminate the product. IR lamp heating also requires relatively long cycle times and imposes high machine costs.

In summary, in order to achieve desirable tolerance levels using conventional extrusion blow molding technology, the containers typically have to undergo some type of cutting, stamping, trimming, or burnishing operation. These operations have not proven to be reliable for producing the required dimensional tolerances. Nor have these operations met the need for reduced cycle times demanded of modern, cost-effective, manufacturing processes. Another disadvantage of cutting, stamping, or trimming is the production of chips. Any packages that have been subjected to an operation that generates chips must go through a series of cleaning steps. This results in extra equipment on the line. It also results in customer complaints and product recalls in the event that all the plastic chips have not been removed from the package.

Therefore, there remains a need in the art for an improved apparatus that overcomes the shortcomings of conventional solutions. To overcome the shortcomings of the current solutions applied to reform plastic containers, a new apparatus is provided. An object of the present invention is to decrease the cycle time (i.e., increase the speed of production output) required to manufacture plastic packages such as containers. A related object is to eliminate or at least minimize cutting, stamping, trimming, or burnishing operations. Another object is to increase the amount of plastic that can be manipulated in a practical cycle time, thereby expanding the feasible applications of the technology.

Yet another object is to decrease the cost and complexity of the machinery used to manufacture plastic packages. An additional object is to replace the IR lamps and heater bands found in the conventional solutions. It is still another object of the present invention to heat a precise area of a package very quickly so that the area can be reformed within efficient cycle times (i.e., to channel or focus the heat energy). A related object is to permit adjustment of the precise area of heating to meet the specific requirements of a particular application.

A further object of the present invention is to provide a quick change (in the field) retrofit kit for an existing refurbishing machine which allows the refurbishing machine to be retrofit with minimal down time and expense. A related object is to retrofit such a machine to incorporate components that provide the functional advantages of advanced reform technology with minimal modifications to the refurbishing machine. Still another related object is to use the existing equipment utilities of the refurbishing machine for the reform heating and cooling processes. Still a further object of the present invention is to avoid the addition of cooling water or induction equipment to the refurbishing machine.

BRIEF SUMMARY OF THE INVENTION

To achieve these and other objects, and to meet these and other needs, and in view of its purposes, the present invention provides a retrofit kit and a method for converting a plastic container refurbishing machine (which typically operates at a temperature of about 400° F.) into a plastic container reforming apparatus (which typically operates at a temperature of about 1,200 to 1,400° F.). The reforming apparatus that results from using the retrofit kit or applying the conversion method reforms a portion of a plastic container by first heating the portion to be reformed via induction then separately reforming the heated (and softened) container portion with a reforming die. The refurbishing machine has (a) a first turret with a first heating assembly and a first proportional-integral-derivative (PID) controller controlling the first heating assembly, and (b) a second turret with a second heating assembly and a second PID controller controlling the second heating assembly.

The retrofit kit includes a reform heating assembly replacing the first heating assembly of the refurbishing machine. The reform heating assembly achieves a temperature of above 500° F., heats the container via radiant and convection heating without contacting the container, and has a power and thermocouple connection to the first PID controller. The kit also includes a reform cooling assembly replacing the second heating assembly of the refurbishing machine. The reform cooling assembly has a mounting adapter or post connecting the reform cooling assembly to the refurbishing machine, a forming die adapted to contact and reform the portion of the container, a support housing a Peltier thermoelectric cooler, a heat sink facilitating heat transfer away from the forming die, and a power and thermocouple connection to the second PID controller.

The conversion method includes the following steps, with removal steps A1 and B1 performed in any order as long as they precede the corresponding installation steps A2 and B2, respectively. Step A1 is removing the first heating assembly from the first turret. Step A2 is installing a reform heating assembly that replaces the first heating assembly of the refurbishing machine, achieves a temperature of above 500° F., heats the container via radiant and convection heating without contacting the container, and has a power and thermocouple connection to the first PID controller. Step B1 is removing the second heating assembly from the second turret. Step B2 is installing a reform cooling assembly that replaces the second heating assembly of the refurbishing machine and has a mounting adapter or post connecting the reform cooling assembly to the refurbishing machine, a forming die adapted to contact and reform the portion of the container, a support housing a Peltier thermoelectric cooler, a heat sink facilitating heat transfer away from the forming die, and a power and thermocouple connection to the second PID controller.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures:

FIG. 7A is a side view, in partial cross section, illustrating one embodiment of the mount of the reform heating assembly;

FIG. 7B is a cross-section taken along the line 7B-7B of FIG. 7A;

FIG. 7C is a top view of the mount shown in FIGS. 7A and 7B;

FIG. 10A is a top view illustrating one embodiment of the insulated body of the reform heating assembly;

FIG. 10B is a cross-section taken along the line 10B-10B of FIG. 10A;

FIG. 10C is a side view of the insulated body shown in FIGS. 10A and 10B;

DETAILED DESCRIPTION OF THE INVENTION

In a sentence, the present invention heats and re-shapes a portion of a plastic package using a reforming apparatus created by retrofitting a refurbishing (finishing or burnishing) machine. To expand slightly, the present invention can be applied to reform the neck finish (the TSS, the internal surface, or the outer surface), handle, or other specific areas of a package by (1) exposing the surfaces that require reforming to a metal workpiece raised to an elevated temperature (approximately 500-2,000° F.); then (2) applying an unheated (perhaps even cooled) reforming die. The reforming apparatus of the present invention replaces the IR lamps and heater bands of conventional reforming machinery with induction heating. Such replacement reduces the cost and complexity of the reforming apparatus considerably.

Various embodiments of the apparatus and method of the present invention are described in detail below. Because the apparatus and method reflect an application of induction heating, a discussion of the principles of induction heating follows. An exemplary reforming device and an exemplary refurbishing machine are described, highlighting the components of each. Then, the reforming apparatus of the present invention, created by retrofitting the refurbishing machine with components that provide the functionality of the reforming device, is described. Several examples of the retrofit components are summarized.

A. An Example Reforming Device

Figure 1:
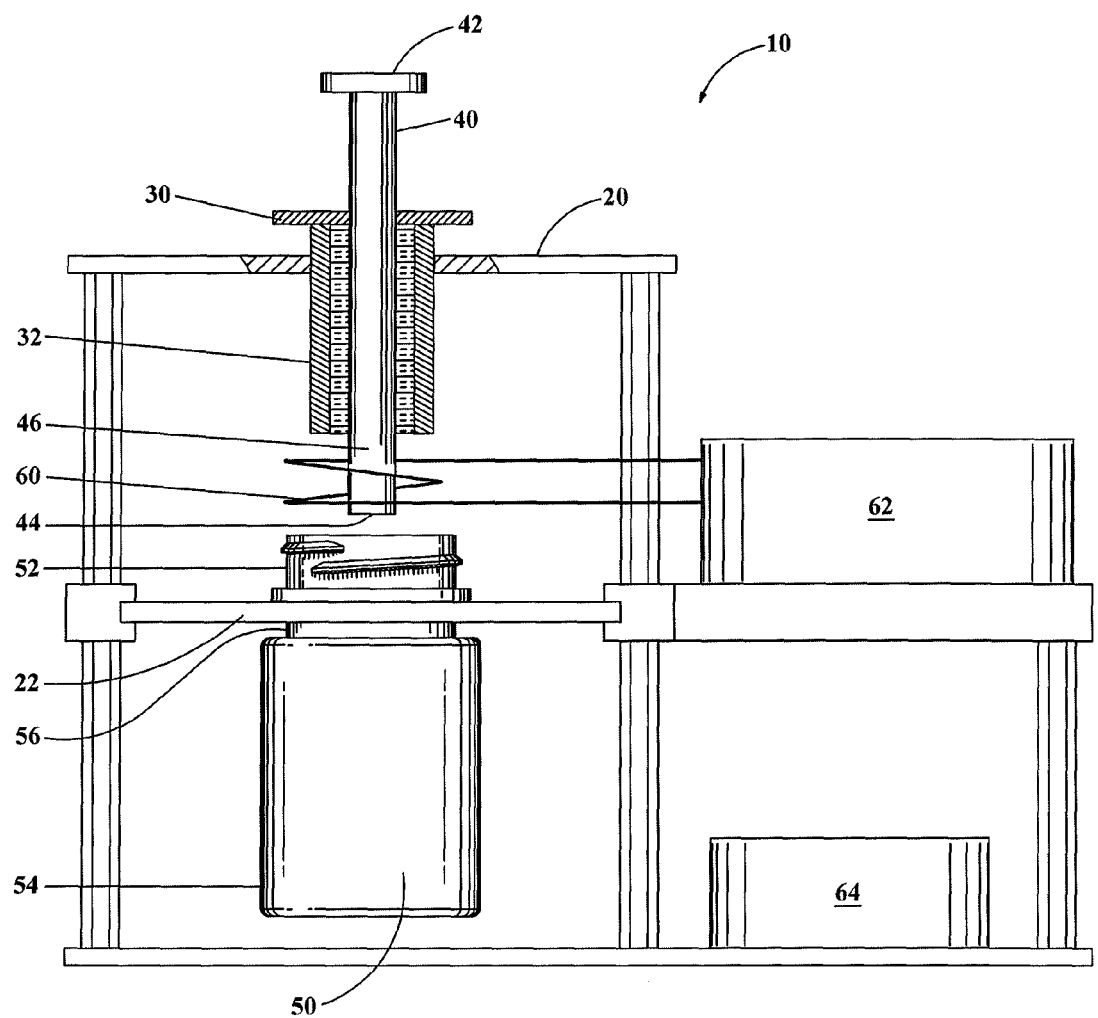
FIG. 1 is a schematic representation of a reforming device.

Referring now to the drawing, in which like reference numbers refer to like elements throughout the various figures that comprise the drawing, FIG. 1 is a simple illustration of a reforming device 10. The reforming device 10 is available from Graham Packaging Company, L.P. of York, Pa. A plastic container 50 includes an upper portion 52 and a body 54. In the exemplary embodiment shown, the plastic container 50 is in the shape of a container, for example, a beverage container, and the upper portion 52 and the body 54 are separated by a neck 56. The upper portion 52 can be adapted and configured to receive a closure, such as a metal lid, a layer of film (e.g., thermo-sealed or glued film), a snap-on lid, or a double-seam metal lid, although other configurations are possible.

One of ordinary skill in the art will know and appreciate that the plastic container 50, the upper portion 52, or both can take other forms. For example, the plastic container 50 may alternatively be a bowl such as a soup bowl, and the upper portion 52 may alternatively include a threaded neck finish or feature other geometries for sealing applications. The present invention is also not limited to sealing applications; rather, it includes features for alignment or assembly. One advantage of the present invention is that custom features can be produced for the alignment or assembly of other components that aid in the function of the total package (injected spouts, pumps, dosage metering devices, and the like). This flexibility opens up new applications because the invention can provide the tight tolerances and features that are required to interact with these devices. Some examples of features are, among others, internal threads, snap beads, anti-rotation features, and grooves for alignment. For purposes of illustration, however, the upper portion 52 is highlighted.

The upper portion 52 is typically formed during the blow molding of the plastic container 50, for example, during extrusion blow molding. The upper portion 52 may additionally or alternatively be formed, or modified, during a trimming or other operation that takes place, for example, after the plastic container 50 is blow molded. Alternatively, the upper portion 52 may be formed in connection with an injection or compression molding process, for example, on plastic containers 50 made using a reheat blow molding process or an injection/extrusion/blow molding process. Alternatively, the upper portion 52 may be formed in connection with an injection molded preform, in which the upper portion 52 is pre-configured during injection molding of the preform.

The reforming device 10 reforms a portion of the plastic container 50, for example, the upper portion 52. The upper portion 52 might be reformed, for example, to provide the shape and dimensional tolerances required for the capping or sealing process. (Distinguish the step of reforming from the steps of cutting, stamping, or trimming the container 50, which typically produce chips of material to be discarded, or from the step of burnishing, which does not manipulate the amount of plastic material quickly enough for efficient production processes.) The method includes softening the portion of the plastic container 50 to be reformed by heating it using induction to generate the original heat source.

The reforming device 10 includes a frame 20 having a neck clamp 22. The neck clamp 22 engages the plastic container 50 and may either hold the plastic container 50 in a fixed position or manipulate (e.g., raise or lower) the plastic container 50. The frame 20 supports a forming die 30, which may be water cooled. The forming die 30 may be stationary or may travel (up and down) along a workpiece support 40. The workpiece support 40 has a head 42 and a foot 44. As a matter of design choice, the workpiece support 40 may be stationary (and the plastic container 50 moved relative to the workpiece support 40), or the workpiece support 40 may move toward and away from the plastic container 50. A ceramic sleeve 32 is provided as an insulator between the forming die 30 and the workpiece support 40.

An induction coil 60 is positioned adjacent to the foot 44 of the workpiece support 40. The induction coil 60 is connected to an induction workhead 62. Among other components, none shown because all are within the knowledge of the artisan, the induction workhead 62 has an alternating current (AC) power supply. The induction workhead 62 may be supported on the frame 20 of the apparatus 10. A programmable logic controller (PLC) 64 provides the electronics for operating the reforming device 10. For example, the PLC 64 controls the timing sequences during operation of the reforming device 10: the plastic container 50 may be subjected to heat transfer for about 1.5 to 8 seconds, then the forming die 30 may engage the plastic container 50 for between about 1 and 3 seconds—all parameters may vary as a function of the type of material and amount of material that requires manipulation.

The induction coil 60 may heat the foot 44 of the workpiece support 40 itself, as shown in FIG. 1, to a temperature of above about 500° F. and preferably between 1,200 to 1,400° F. In this embodiment, the workpiece 46 (i.e., the material to be heated by the induction coil 60) is a rod-like portion of the workpiece support 40. The workpiece 46 may take other forms, however, including a heating disk. The workpiece 46 is preferably made of a metal.

In the embodiment illustrated, the induction coil 60 surrounds the workpiece 46. It would be possible, however, to place a custom-shaped induction coil 60 on one side of the workpiece 46 rather than completely around the workpiece 46. Such placement could rely on the workpiece 46 becoming a uniform temperature due to conduction of heat through the workpiece 46. When the workpiece 46 is large or an odd shape, the workpiece 46 might be rotated to ensure that it attains a uniform temperature. Placement of the induction coil 60 aside rather than around the workpiece 46 would reduce the cost of the production machine because the induction coil 60 could be placed on the ground (stationary) rather than on the rotating part of the machine (rotary turret). Placement of electrical equipment on a rotary turret requires rotary couplers to transfer power and electrical signals into the turret. These couplers increase the complexity and cost of the production machine.

The workpiece 46 transfers heat to the plastic container 50, once brought into close proximity to the plastic container 50, via radiant and convection heating. As the plastic container 50 absorbs heat, it softens. After the plastic reaches an optimized temperature, typically about 280 to 300° F., the forming die 30 contacts the plastic. The forming die 30 creates the final shape of the heated plastic.

The forming die 30 may incorporate cooling via a water-fed chiller (not shown) and may also incorporate an alignment system (also not shown). The alignment system orients the forming die 30 along the workpiece support 40. To give the forming die 30 the requisite finish quality, various techniques such as polishing and sandblasting may be used. The forming die 30 may also incorporate start timers that signal the PLC 64 based on the location of the forming die 30.

The materials used to form the workpiece 46 must be selected carefully. The geometry of the workpiece 46 (e.g., outside diameter, width, length, thickness) is also important and must be selected carefully. Like the forming die 30, the workpiece 46 may also incorporate start timers that signal the PLC 64 based on the location of the workpiece 46.

B. An Example Refurbishing Machine

Figure 2A:
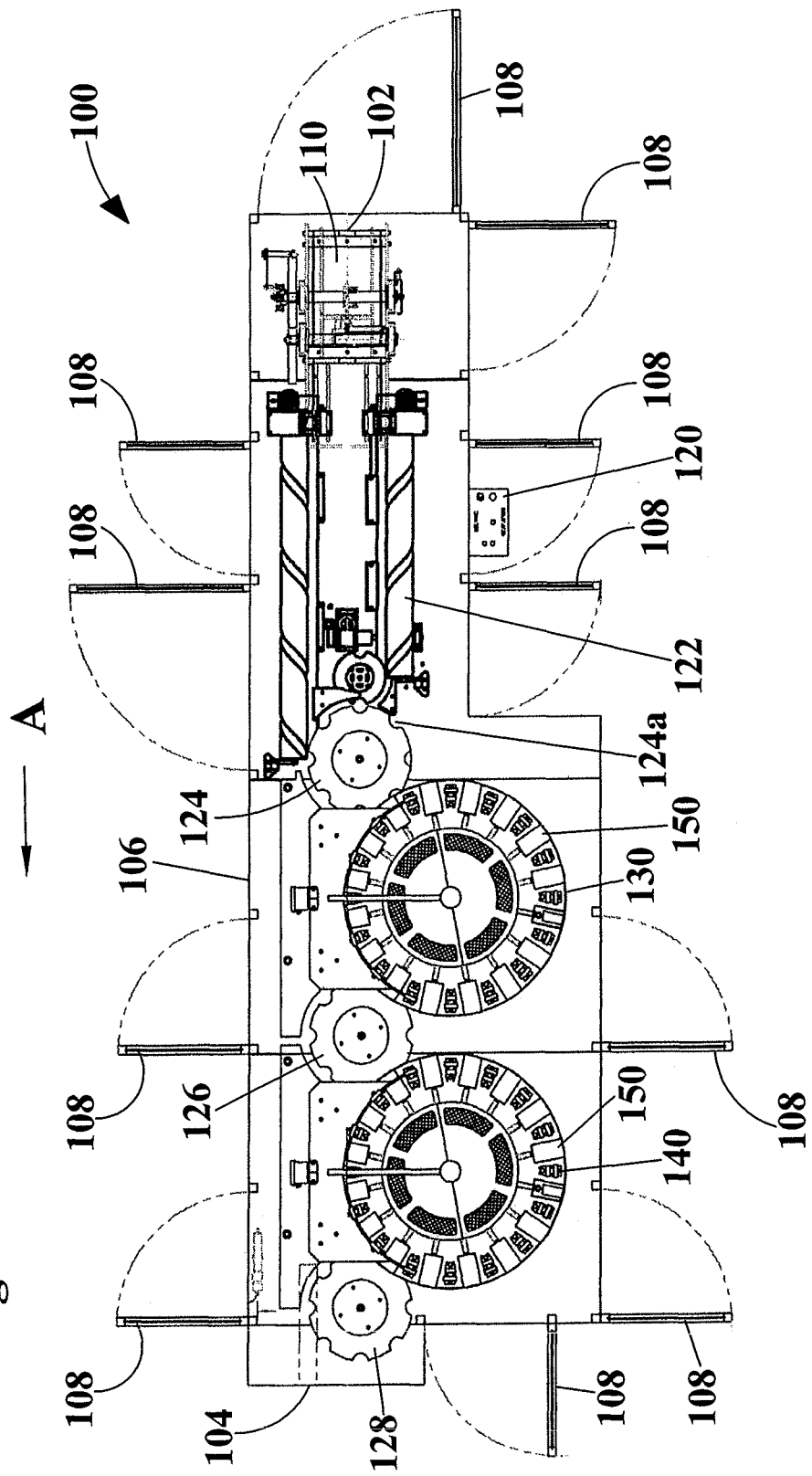
FIG. 2A is a top view of a refurbishing machine.
Figure 2B:
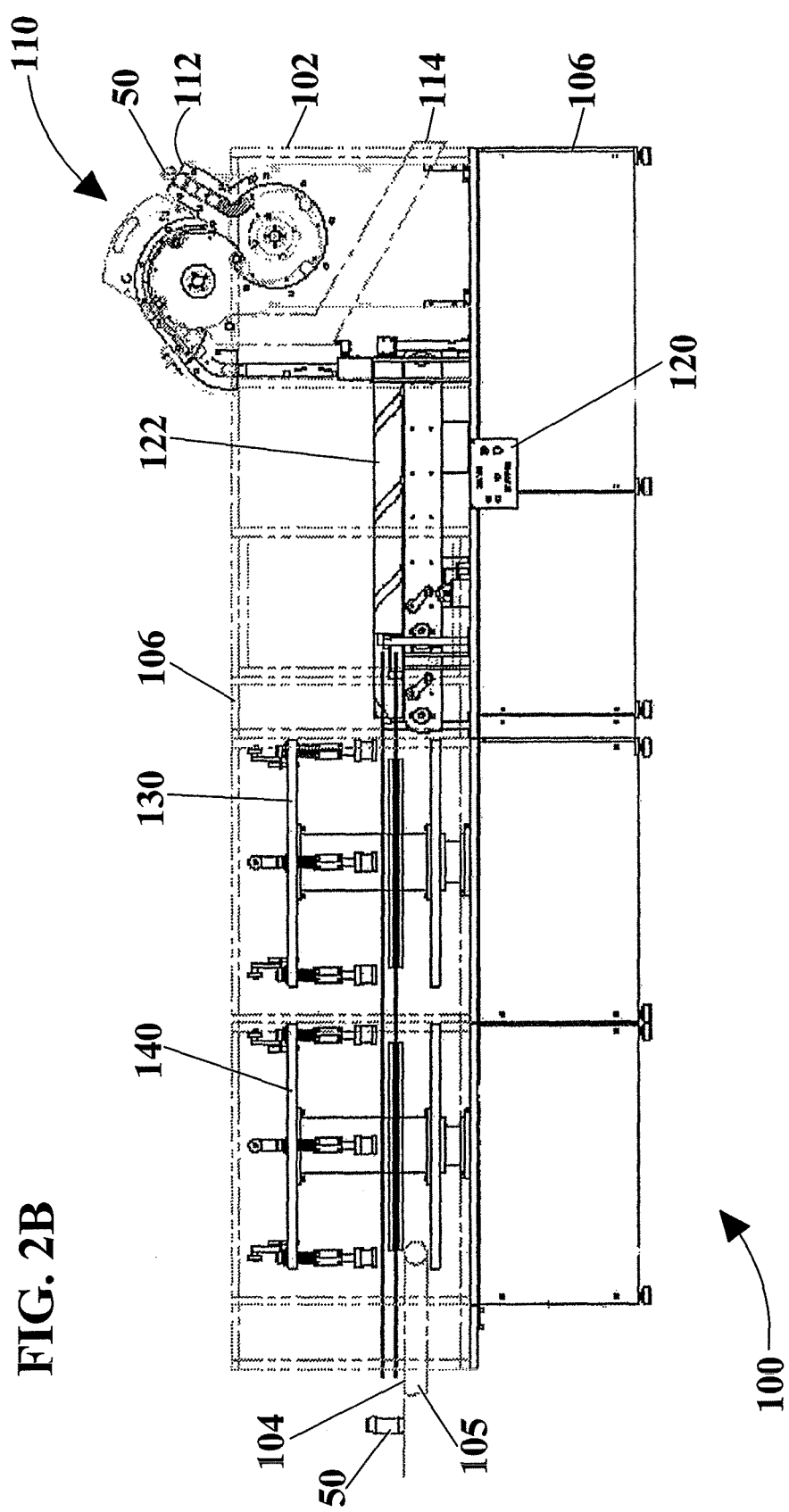
FIG. 2B is a side view of the refurbishing machine illustrated in FIG. 2A.

FIG. 2A is a top view and FIG. 2B is a side view of a refurbishing machine 100. The refurbishing machine 100 is available from Belvac Production Machinery, Inc. of Lynchburg, Va. The refurbishing machine 100 is used in a production environment, producing high-volume runs of up to 400 containers per minute, to produce the container 50 having a refurbished portion. The refurbishing machine 100 is electrically driven by a motor through a gear reducer and a series of pulleys.

Although not important to the present invention, the refurbishing machine 100 may include a trimmer 110 proximate the input end 102 of the refurbishing machine 100. The trimmer 110 trims the container 50, using knives, and removes or ejects the scrap produced by the trimming operation via a scrap discharge 114. The containers 50 may be delivered to the trimmer 110 via an infeed 112. A moil guide spins the container 50 around its own axis using friction, while the knife edge penetrates the trim line.

The refurbishing machine 100 has a frame 106 with a plurality of doors 108 (or access panels) allowing selective access to the various components of the refurbishing machine 100 that act upon the containers 50. An operator console 120 may be supported on the frame 106 of the refurbishing machine 100. A PLC in or interacting with the operator console 120 provides the electronics for operating the refurbishing machine 100. For example, the PLC controls the timing sequences during operation of the refurbishing machine 100.

The containers 50 are delivered to the refurbishing machine 100 at the input end 102. The containers 50 travel, in the direction of arrow "A" shown in FIG. 2A, toward the discharge end 104 of the refurbishing machine 100. A screw feed 122 takes the containers 50 from the input end 102 (and, if the trimmer 110 is provided, from the trimmer 110) to a first star wheel 124. The screw feed 122 separates the containers 50 so that the spacing between the containers 50 corresponds with the stations 124a on the first star wheel 124.

The first star wheel 124 accepts the containers 50 from the screw feed 122 and delivers the containers to a first turret 130. A second star wheel 126 accepts the containers 50 from the first turret 130 and delivers the containers 50 to a second turret 140. A third star wheel 128 accepts the containers 50 from the second turret 140 and delivers the containers 50 to a discharge conveyor 105 located proximate the discharge end 104 of the refurbishing device.

Each of the turrets 130, 140 has tooling designed to operate on the container 50. Although two turrets 130, 140 are shown, each performing a separate operation, a single turret could be designed to perform the combined operations. The turrets 130, 140 have equal numbers of identical stations 150 for receiving and operating on an individual container 50. In one example operation, the first turret 130 breaks the inner edge of the container 50 and the second turret 140 forms a flat top on the container 50.

Figure 3:
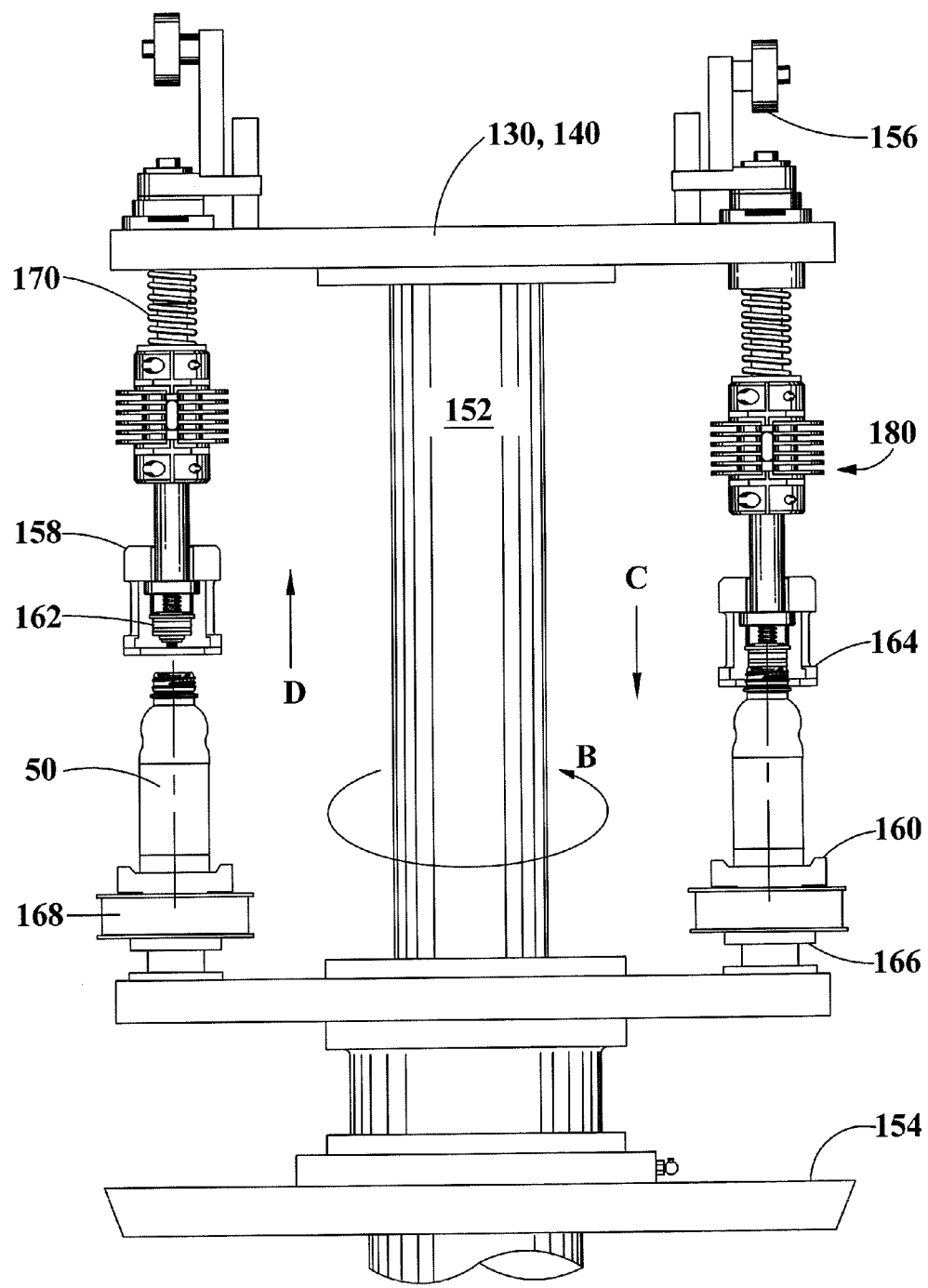
FIG. 3 illustrates a particular finishing station of the refurbishing machine illustrated in FIGS. 2A and 2B.

Typically, the turrets 130, 140 each have eight or, as illustrated in FIGS. 2A and 2B, sixteen stations 150. A particular finishing station 150 of the turrets 130, 140 is illustrated in FIG. 3. The turrets 130, 140 with the finishing station 150 rotate around a central shaft 152 in the direction of arrow "B" in FIG. 3. The central shaft 152 is supported by a main base 154. A cam follower 156 corresponding to each finishing station 150 engages the frame 106, supports the finishing station 150 on the frame 106, and facilitates movement of the finishing station 150.

Each station 150 houses a finishing (or burnishing) head 158 and a corresponding container chuck 160. Each station 150 has a heated finishing tool 162 that accepts a container 50 and finishes a portion of the container 50 while the finishing tool 162 pushes the container 50 against the container chuck 160. For a curling operation, the same mechanism is used with a different type of tooling to produce a curled container

50. The neck 56 of the container 50 is held by a live (free spinning) neck control ring 164 for stability during the finishing or curling operation.

A push pad is mounted on a spindle assembly 166. The spindle assembly 166 can be either idle or driven by a fixed belt (e.g., the spindle drive pulley 168) around the station 150. This motion spins the push pad and, therefore, the container 50 about its own axis and around the tool in order to finish the container 50.

In operation, the finishing tool 162 is pushed downward, using the action of the return spring 170, in the direction of arrow C in FIG. 3. As shown in the right-hand section of FIG. 3, the finishing tool 162 finishes a portion of the container 50 while pushing the container 50 against the container chuck 160. Once the finishing operation is complete, the finishing tool 162 is pushed upward, against the action of the return spring 170, in the direction of arrow D in FIG. 3. The finished container 50 is then accessible for removal from the station 150.

Figure 4:
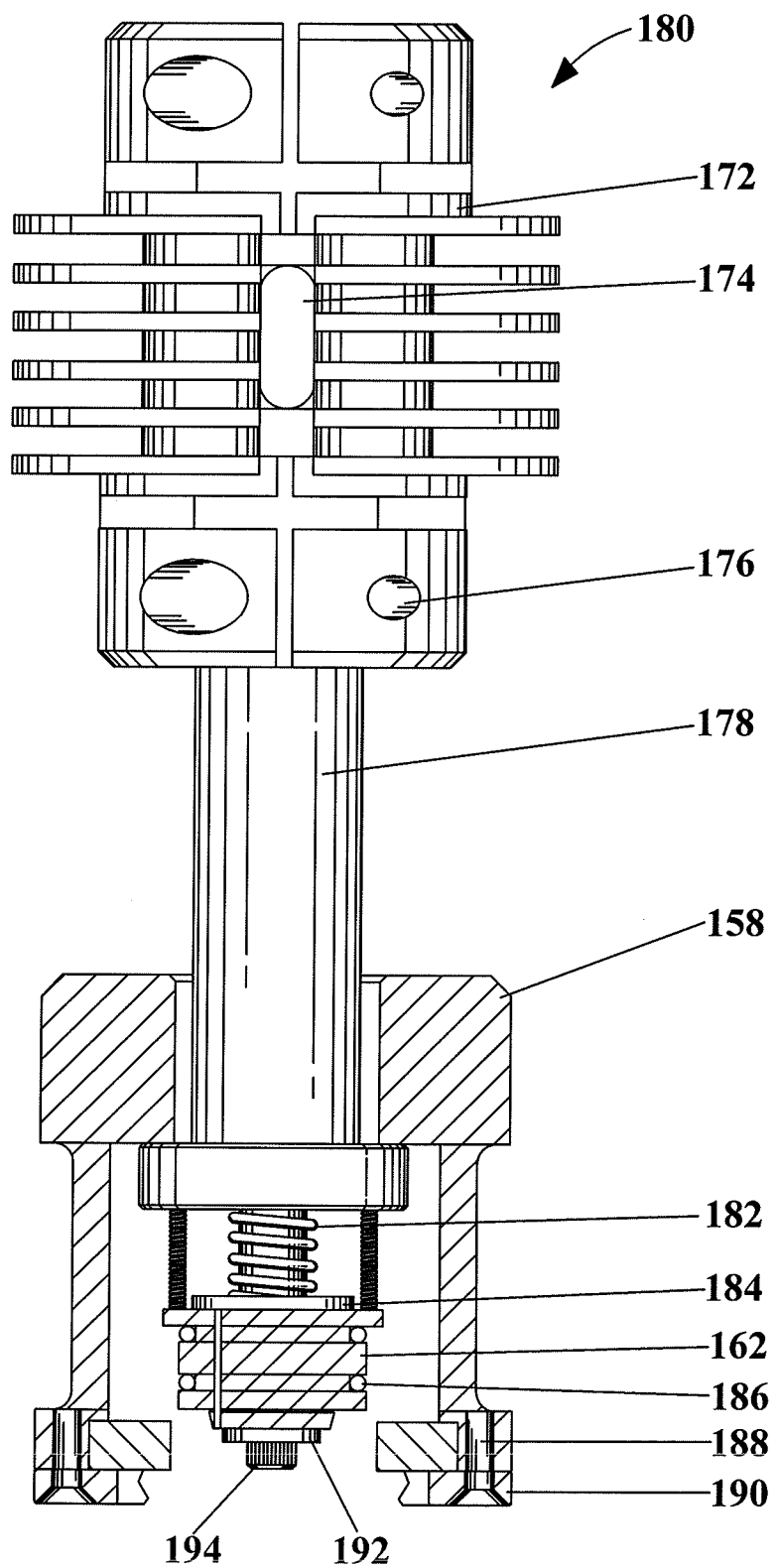
FIG. 4 highlights the heating assembly, used to heat the finishing tool, of the refurbishing machine illustrated in FIGS. 2A and 2B.

As stated above, the finishing tool 162 is heated. The heating assembly 180, used to heat the finishing tool 162 and illustrated broadly in FIG. 3, is highlighted in FIG. 4. As shown in FIG. 4, the heating assembly 180 has a heat sink collar 172 and a heater 174 which is located within a tool shaft 178. A socket head cap screw 176 affixes the heat sink collar 172 (and the heater 174) to the tool shaft 178. At its lower end, below the finishing head 158, the heating assembly 180 has a spring 182, a spring washer 184, a tool expansion spring 186, a control ring 188, and a housing cap 190. A tool washer 192 and a fastener 194 affix the finishing head 158 and its related components to the tool shaft 178.

The finishing tool 162 or the heater 174 can be removed and replaced as needed. Both maintenance procedures begin with removal of the tooling, which includes the following steps. First, the insulation blanket (not shown) is removed from around the heating assembly 180. The finishing tool 162 is inspected to assure that it is not hot. If not, then the housing cap 190 is removed, followed by removal of the control ring 188. Next, the fastener 194, the tool washer 192, the finishing tool 162, the spring washer 184, and the spring 182 are removed.

To replace the finishing tool 162, the tool expansion spring 186 is placed on the tooling. The spring 182, the spring washer 184, the new finishing tool 162, and the tool washer 192 are, in turn, placed on the tool shaft 178. Then the fastener 194 is replaced. Finally, the insulation blanket is replaced.

To replace the heater 174, the heater 174 is first disconnected from the heater control box (not shown). Then the tooling components are removed according to the steps described in the penultimate preceding paragraph. The socket head cap screw 176 in the heat sink collar 172 is loosened, and the tool shaft 178 and finishing head 158 are removed. The heater 174 is pulled from the middle of the tool shaft 178 and a new heater 174 is installed. The steps are then reversed to reassemble the components.

The heating assembly 180 heats the finishing tool 162 to between 300-500° F. and, preferably, to about 400° F. At this temperature, the finishing tool 162 often sticks to the plastic material of the container 50—which the finishing tool 162 contacts during normal operation of the refurbishing machine 100. The present invention avoids this problem by increasing the temperature, avoiding contact between a heated tool and the container 50, and using radiant heat.

More specifically, in the production environment the burnishing tool temperature is increased to soften the plastic faster. Faster softening time means more plastic can be manipulated and at faster rates. The problem with increasing the burnishing tool temperature is that plastic begins to stick to the burnishing tool once the burnishing tool exceeds a certain temperature. The present invention avoids this sticking problem because the workpiece 46 does not contact the container 50. By removing contact, the present invention can maximize the heat transfer rate to the plastic by elevating the tool temperature well above (e.g., well above 500° F.) the typical operating window of burnishing tools.

The refurbishing machine 100 does not have the utilities (induction heating and water cooling) necessary to implement the reform technology. Therefore, these utilities would have to be incorporated into the refurbishing machine 100 to permit the refurbishing machine 100 to reform the container 50. Such an incorporation process would be expensive and would require the refurbishing machine 100 to be removed from the manufacturing environment. The present invention avoids this problem by using the existing equipment utilities of the refurbishing machine 100 to provide both the heating and the cooling necessary to reform.

C. The Retrofit Refurbishing Apparatus for Reforming

The reform technology implemented by reforming device 10 requires that the surface of the workpiece 46 reach temperatures of above about 500° F. and preferably about 1,200 to 1,400° F. This temperature range is important to minimize machine cycle times: low temperatures mean longer cycle times. The reform technology uses induction heating to bring the workpiece 46 up to temperature. Induction heating equipment is expensive and would require extensive work to the existing refurbishing machine 100 to retrofit the refurbishing machine 100 so that the refurbishing machine 100 could reform the container 50. Such extensive work would mandate relocation of the refurbishing machine 100 from the production facility for modifications. A better approach would be to use the existing power found on the first turret 130 for the reform heating process.

The reform technology uses cooling water to maintain the temperature of the forming die 30. This cooling water must go through a rotary union to reach the forming die 30. Were the refurbishing machine 100 to be retrofit so that the refurbishing machine 100 could reform the container 50, therefore, the refurbishing machine 100 would need to be retrofit with a rotary union. Retrofitting cooling water to the refurbishing machine 100 would be expensive and, again, would require the refurbishing machine 100 to be removed from the factory for the work. A better approach would be to use the existing power found on the second turret 140 for the reform cooling process.

The solution achieved by the present invention combines the concepts of the reforming device 10 of Section A above with the refurbishing machine 100 of Section B above. More specifically, the refurbishing machine 100 can be equipped with a reform heating assembly 210 and a reform cooling assembly 230, which perform the functions of elements included in the reforming device 10, to create a reforming apparatus 200 that can reform the container 50. The reforming apparatus 200 can be constructed as a new machine. Alternatively, the reforming apparatus 200 can be constructed by removing certain components of a pre-existing refurbishing machine 100 and replacing those components with reform heating and cooling assemblies 210 and 230, respectively, thereby retrofitting the refurbishing machine 100 in the field (i.e., at a production facility). The retrofit process includes two relatively simple steps: one replaces the heating assembly 180 of the first turret 130 with the reform heating assembly 210 and the second replaces the heating assembly 180 of the second turret 140 with a reform cooling assembly 230.

1. The Heating Process

Figure 5:
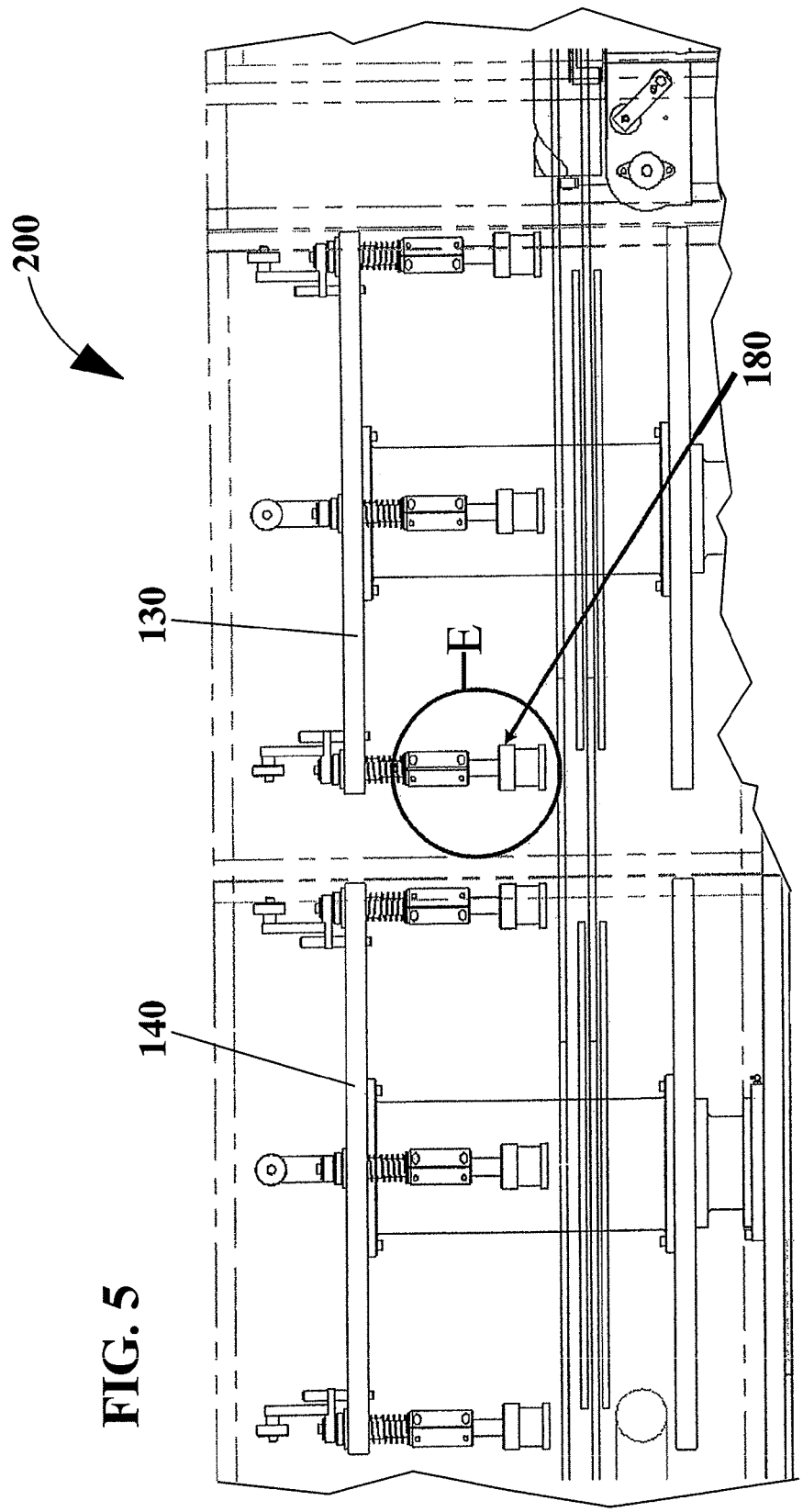
FIG. 5 illustrates the first step of retrofitting the refurbishing machine to create a reforming apparatus according to the present invention, in a partial side view highlighting removal of the heating assembly of the first turret of the refurbishing machine to be retrofit.

The first step of the method of retrofitting the refurbishing machine 100, to create the reforming apparatus 200, is to replace the heating assembly 180 of the first turret 130 with the reform heating assembly 210. Removal of the heating assembly 180 is accomplished using the process described above. The heating assembly 180 to be removed is highlighted by the circle "E" in FIG. 5, which is a partial side view of the refurbishing machine 100 to be retrofit.

Figure 6A:
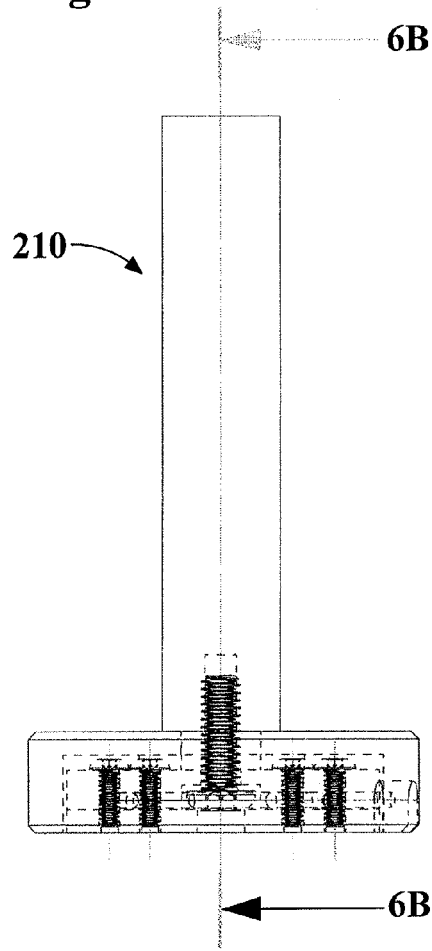
FIG. 6A is a front view of the reform heating assembly used to retrofit the refurbishing machine and create the reforming apparatus according to the present invention.
Figure 6B:
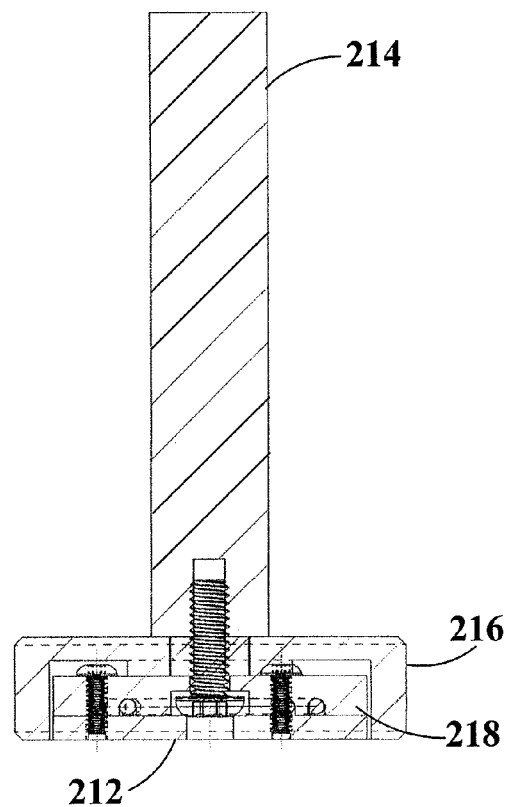
FIG. 6B is a cross-section taken along the line 6B-6B of FIG. 6A.
Figure 6C:
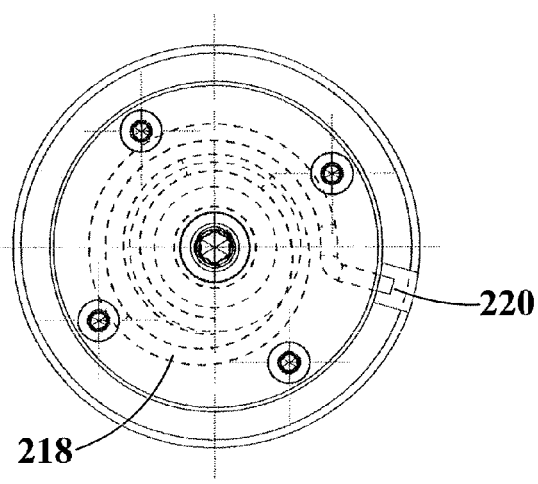
FIG. 6C is a top view of the reform heating assembly shown in FIGS. 6A and 6B.

One embodiment of the reform heating assembly 210 is illustrated in FIGS. 6A, 6B, and 6C. FIG. 6A is a front view of the reform heating assembly 210. FIG. 6B is a cross-section taken along the line 6B-6B of FIG. 6A. FIG. 6C is a top view of the reforming heating assembly 210. The temperature of the reform heating assembly 210 reaches above 500° F. and preferably between approximately 1,200 to 1,400° F. at its lower heated surface 212, which is positioned proximate the container 50 to be reformed. The reform heating assembly 210 does not contact the container 50; rather, the reform heating assembly 210 heats the container 50 via radiant and convection heating.

The reform heating assembly 210 is quickly and easily connected to the refurbishing machine 100 through a mount 214. An insulated body 216 is provided at the lower end of the mount 214. The insulated body 216 houses a heat element 218, which generates heat. A variety of designs for the heat element 218 are possible, some of which are outlined as follows.

One design for the heat element 218 consists of custom-shaped heater plates (preferably 300 or 400 series stainless steel) that sandwich a coil heater. The heater plates can withstand the relatively high temperatures (above 500° F. and preferably between 1,200 to 1,400° F.) needed to reform the container 50. Hotset of Battle Creek, Mich., manufactures electric heaters including coil heaters, mini coil heaters, flexible tubular heaters, and cartridge heaters, and can provide this design (www.hotset.com). Tempco Electric Heater Corporation of Wood Dale, Ill., also manufactures electric heating elements for a wide range of industrial and commercial applications, and can provide this design (www.tempco.com).

The heat element 218 could also be a resistant wire formed in a helical or spiral shape. Spiral micro-heaters are available from MHI, Inc. of Cincinnati, Ohio (www.mhi-inc.com/Microheaters_spiral.html) and are similar to an automobile cigarette lighter. An advantage of this design is that resistant wire heaters can reach higher temperatures than conventional heating elements. Higher temperature mean faster cycle times, to a point. Drawbacks to this design are that the machine operator is at risk of being shocked from the wire element and the system is somewhat delicate.

A power and thermocouple connection 220 is provided to heat element 218. The reform heating assembly 210 is powered by the proportional-integral-derivative (PID) controller that already exists on the refurbishing machine 100. A PID controller is a generic control loop feedback mechanism (controller) widely used in industrial control systems. A PID controller attempts to correct the error between a measured process variable and a desired set point by calculating and then outputting a corrective action that can adjust the process accordingly and rapidly, to minimize the error.

Another embodiment of the reform heating assembly 210 is illustrated, in more detail, in FIGS. 7A, 7B, 7C, 8A, 8B, 9A, 9B, 10A, 10B, and 10C. FIGS. 7A, 7B, and 7C illustrate the mount 214 of the reform heating assembly 210. Specifically, FIG. 7A is a side view, in partial cross section, of the mount 214; FIG. 7B is a cross-section taken along the line 7B-7B of FIG. 7A; and FIG. 7C is a top view of the mount 214. The mount 214 is preferably made of steel. As shown in the figures, the length of the cylindrical-shaped mount 214 from its top 214a to its bottom 214b is approximately 14.61 cm (or 5.75 inches).

A collar 214c extends from the top 214a, a distance of about 0.64 cm (or 0.25 inches), for engagement with the first turret 130 of the refurbishing machine 100. The collar 214c has an outside diameter 214f of about 1.27 cm (or 0.5 inches). A hole 214h extends longitudinally through the collar 214c and partially into the body 214e of the mount 214. The body 214e has an outside diameter of about 3.20 cm (or 1.26 inches). The hole 214h receives a projection from the first turret 130, or a fastener (not shown), to facilitate attachment of the mount 214 to the first turret 130. The hole 214h may be threaded along at least part of its length. Thus, the reform heating assembly 210 is quickly and easily connected to the refurbishing machine 100 through the mount 214.

The hole 214h ends at the top of a central passage 214p that extends longitudinally from the hole 214h through the bottom 214b of the mount 214—a distance of about 12.70 cm (or 5 inches). The passage 214p has a diameter 214d of about 1.91 cm (or 0.75 inches). An aperture 214g is disposed perpendicular to the passage 214p. The center of the aperture 214g is located about 7.62 cm (or 3 inches) from the bottom 214b. The aperture 214g has a diameter of about 1.58 cm (or 0.62 inches) and extends across the body 214e of the mount 214, creating an opening in the body 214e. The combination of the passage 214p and the aperture 214g gives the user the option to route connections 228 (see FIG. 11) though the aperture 214g and the passage 214p to the power and thermocouple connection 220.

Figure 8A:
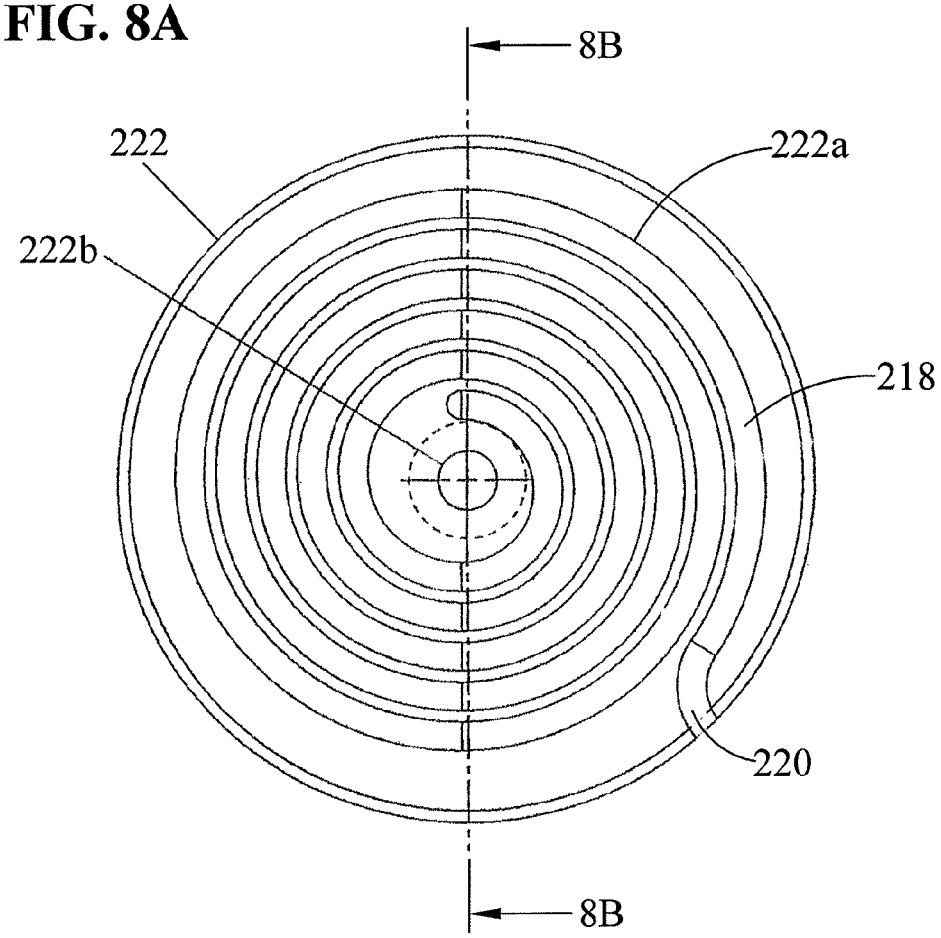
FIG. 8A is a top view illustrating one embodiment of the heat dispersion block of the reform heating assembly.
Figure 8B:
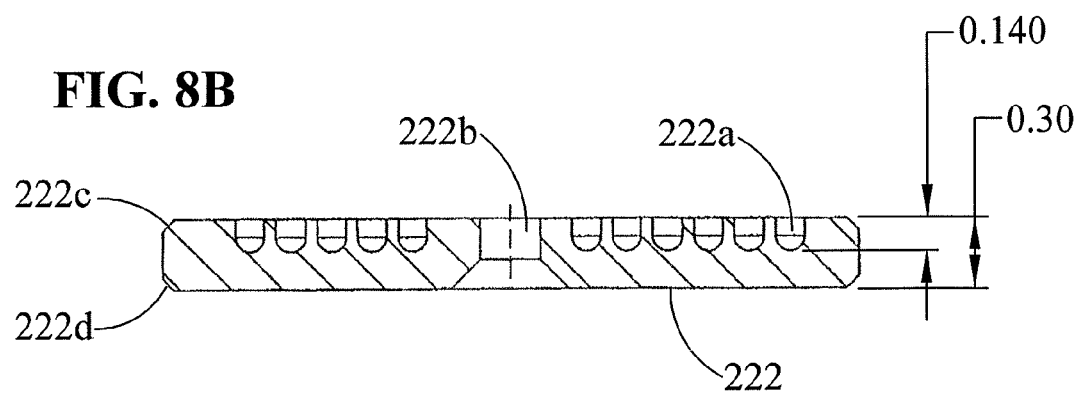
FIG. 8B is a cross-section taken along the line 8B-8B of FIG. 8A.

FIG. 8A is a top view of a heat dispersion block 222, and FIG. 8B is a cross-section taken along the line 8B-8B of FIG. 8A, of the reform heating assembly 210. The heat dispersion block 222 is preferably made of stainless steel, such as 304 stainless steel. As shown in the figures, the heat dispersion block 222 has a helical or spiral groove 222a. The heat element 218 and the power and thermocouple connection 220 fit within the spiral groove 222a. The heat dispersion block 222 also has a central opening 222b with a diameter of about 0.65 cm (or 0.257 inches).

The diameter of the heat dispersion block 222 is approximately 7.62 cm (or 3 inches). As shown in FIG. 8B, the height of the heat dispersion block 222 is approximately 0.76 cm (or 0.3 inches) and the height of the spiral groove is approximately 0.36 cm (or 0.14 inches). The heat dispersion block 222 has a chamfer 222c and a break edge 222d to facilitate engagement with the cover plate 224.

Figure 9A:
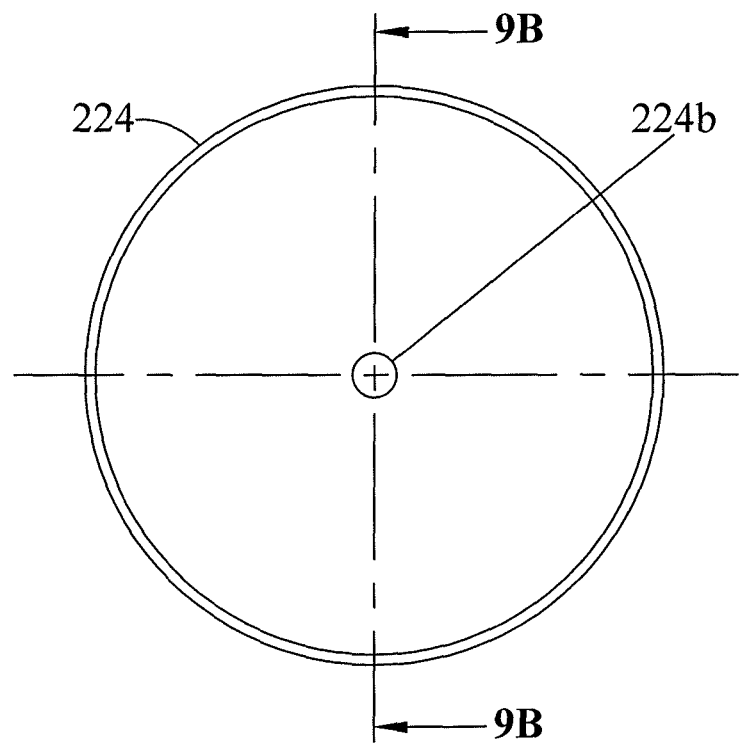
FIG. 9A is a top view illustrating one embodiment of the cover plate of the reform heating assembly.
Figure 9B:
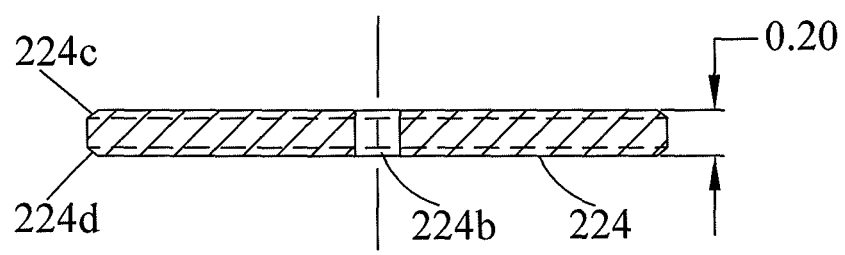
FIG. 9B is a cross-section taken along the line 9B-9B of FIG. 9A.

FIG. 9A is a top view of the cover plate 224, and FIG. 9B is a cross-section taken along the line 9B-9B of FIG. 9A, of the reform heating assembly 210. Like the heat dispersion block 222, the cover plate 224 is preferably made of stainless steel, such as 304 stainless steel. As shown in the figures, the cover plate 224 has several dimensions in common with the heat dispersion block 222. The diameter of the cover plate 224 is approximately 7.62 cm (or 3 inches) and the cover plate 224 has a central opening 224b with a diameter of about 0.65 cm (or 0.257 inches).

The height of the cover plate 224 is approximately 0.51 cm (or 0.20 inches). Like the heat dispersion block 222, the cover plate 224 has a chamfer 224c and a break edge 224d to facilitate engagement with the heat dispersion block 222. The cover plate 224 is fixed to the heat dispersion block 222 so as to form a single, monolithic unit. Such fixation may be achieved, for example, by welding the two components together. (Although fasteners could be used to attach the components together, this option is not currently preferred because the inclusion of fasteners affects the heat distribution through the heat dispersion block 222 and the cover plate 224.) Thus, the cover plate 224 sandwiches the heat element 218 and the power and thermocouple connection 220 within the spiral groove 222a of the heat dispersion block 222. Preferably the heat element 218, the power and thermocouple connection 220, or both components are brazed into the heat dispersion block 222. Brazing fills the voids between the heat element 218 (and, if also brazed, the power and thermocouple connection 220) and the heat dispersion block 222, which promotes heat transfer and increased life for the heat element 218.

The monolithic unit of the heat dispersion block 222 and the cover plate 224 is placed into the insulated body 216. FIGS. 10A, 10B, and 10C illustrate an embodiment of the insulated body 216 of the reform heating assembly 210. Specifically, FIG. 10A is a top view of the insulated body 216; FIG. 10B is a cross-section taken along the line 10B-10B of FIG. 10A; and FIG. 10C is a side view of the insulated body 216. The insulated body 216 is preferably made of steatite. Steatite is a ceramic (magnesium silicate) material with high resistivity, low thermal conductivity (i.e., it is an insulator), moderate strength, and excellent electrical properties.

As shown in the figures, the insulated body 216 has a height from its top 216a to its bottom 216b of approximately 3.30 cm (or 1.30 inches), an external diameter 216d of about 9.14 cm (or 3.6 inches), and an internal diameter defined by the wall of the body 216e of about 8.13 cm (or 3.2 inches). The thickness of the top 216a is about 0.51 cm (or 0.20 inches). A buttress 216c extends from the top 216a, a distance of about 0.25 cm (or 0.1 inches), and defines a center hole 216h. The buttress 216c has a width of about 2.03 cm (or 0.80 inches). The diameter of the center hole 216h is about 1.30 cm (or 0.51 inches). The center hole 216h is used to attach, via a fastener, the monolithic unit of the heat dispersion block 222 and the cover plate 224 to the insulated body 216 and, in turn, all three components to the mount 214.

Figure 11:
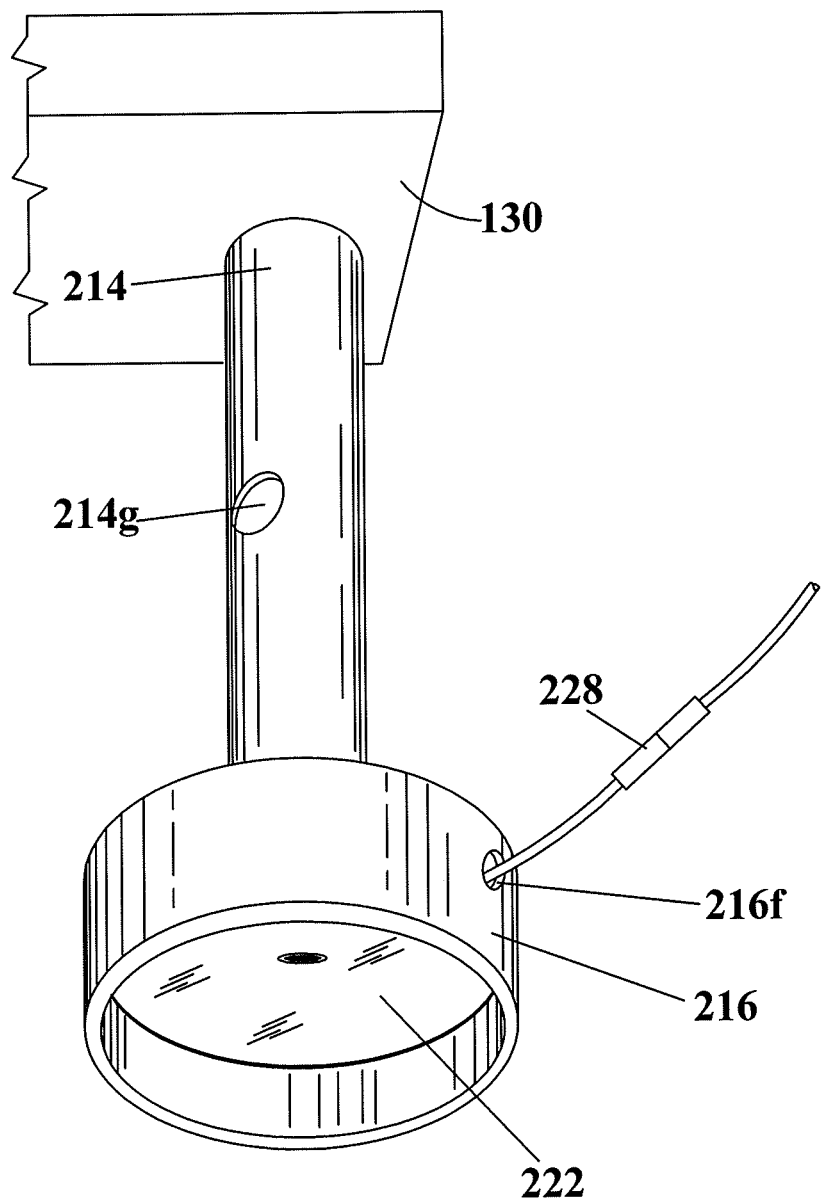
FIG. 11 illustrates the example reform heating assembly in position, affixed to the first turret of the refurbishing machine.

The insulated body 216 has a side hole 216f extending through the wall of the body 216e. The side hole 216f has a diameter of about 1.27 cm (or 0.5 inches) and its center is located below the top 216a by a distance 216g of about 1.40 cm (0.55 inches). The side hole 216f gives the user the option to route connections 228 through the side hole 216f to the power and thermocouple connection 220 (as illustrated in FIG. 11). As disclosed above, the connections 228 might alternatively be routed through the combination of the passage 214p and the aperture 214g of the mount 214.

The dimensions of the various components assure the existence of an air gap between the body 216e of the insulated body 216 and the outside edges of both the heat dispersion block 222 and the cover plate 224. In addition, the cover plate 224 contacts the buttress 216c of the insulated body 216, leaving another air gap between the top 216a of the insulated body 216 and the cover plate 224 in the area on either side of the buttress 216c. These air gaps help to control heat transfer via convection.

Preferably, the ceramic insulated body 216 is given a specific, information-providing color. For example, the color red warns the user that the components in the area of the insulated body 216 are hot. In addition, in the unlikely event that the insulated body 216 were to break into shards, the colored shards could be easily detected and recovered. The color may be provided by glazing the insulated body 216.

FIG. 11 illustrates the reform heating assembly 210 in position, affixed to the first turret 130 of the refurbishing machine 100. The monolithic combination of the heat dispersion block 222 and the cover plate 224 is located within the insulated body 216 and attached to the mount 214. The mount 214 is attached directly to the first turret 130.

2. The Cooling Process

Figure 12:
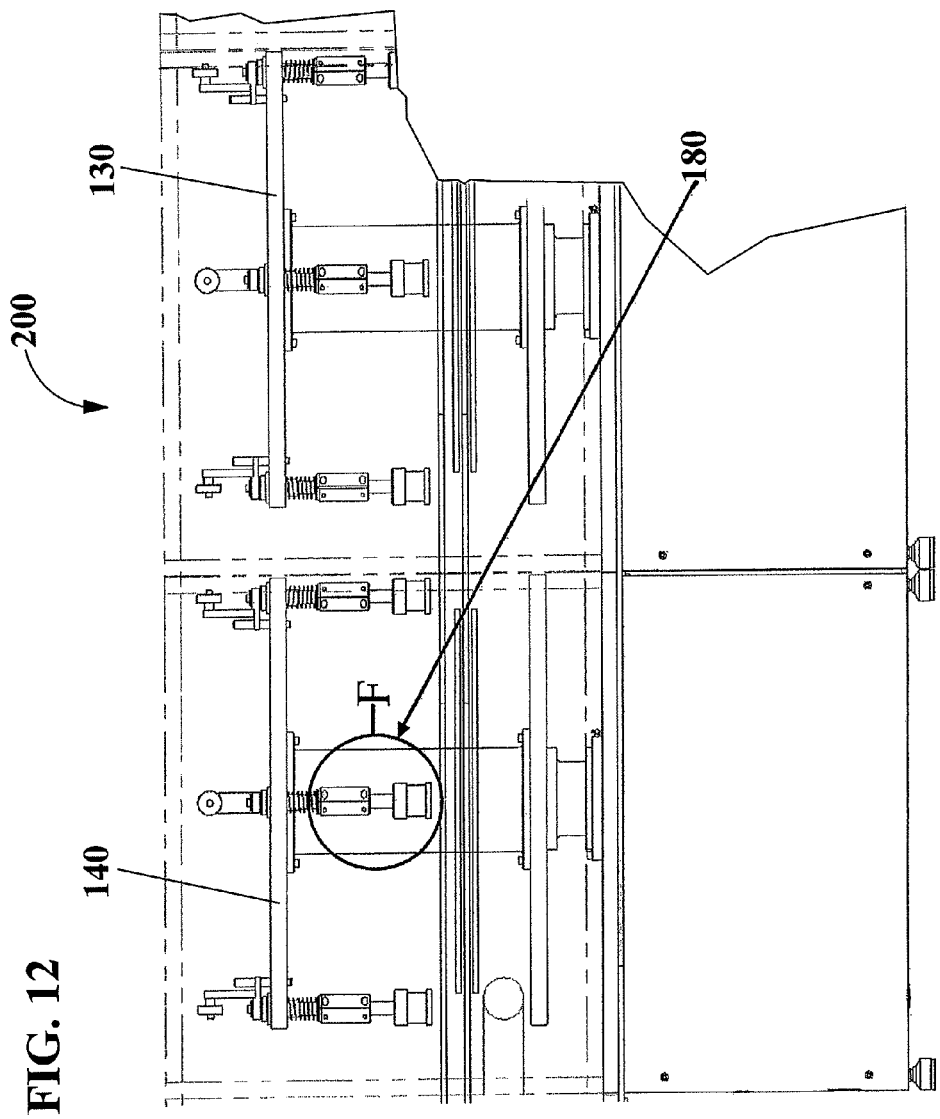
FIG. 12 illustrates the second step of retrofitting the refurbishing machine to create a reforming apparatus according to the present invention, in a partial side view highlighting removal of the heating assembly of the second turret of the refurbishing machine to be retrofit.

The second step of the method of retrofitting the refurbishing machine 100, to create the reforming apparatus 200, is to replace the heating assembly 180 of the second turret 140 with the reform cooling assembly 230. Removal of the heating assembly 180 is accomplished using the process described above. The heating assembly 180 to be removed is highlighted by the circle "F" in FIG. 12, which is a partial side view of the refurbishing machine 100 to be retrofit.

Figure 13A:
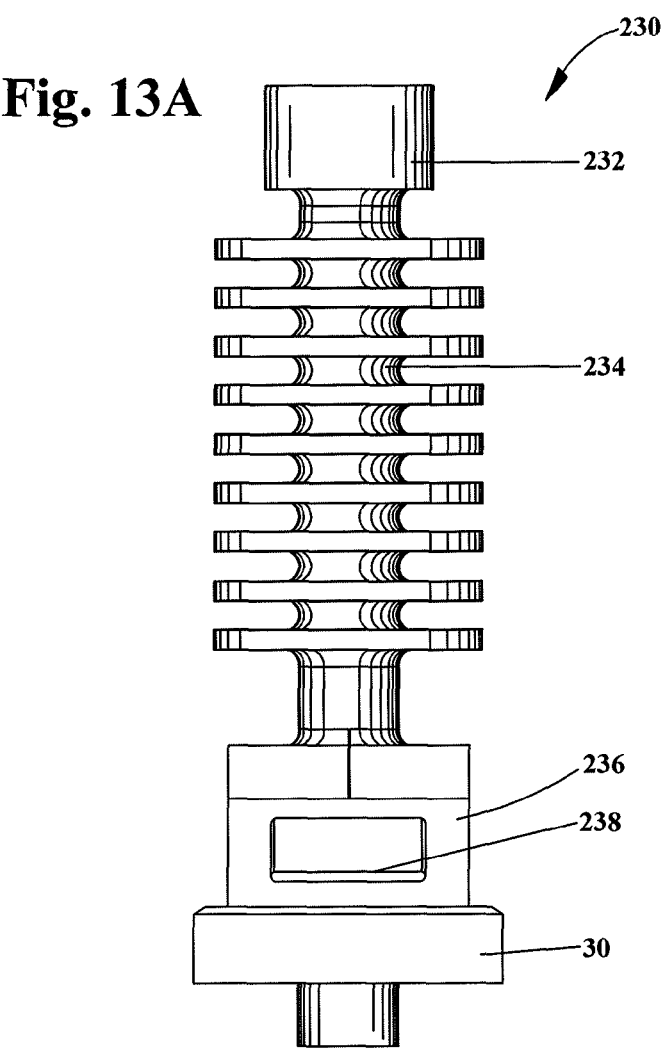
FIG. 13A is a front view of a first embodiment of the reform cooling assembly used to retrofit the refurbishing machine and create the reforming apparatus according to the present invention.
Figure 13B:
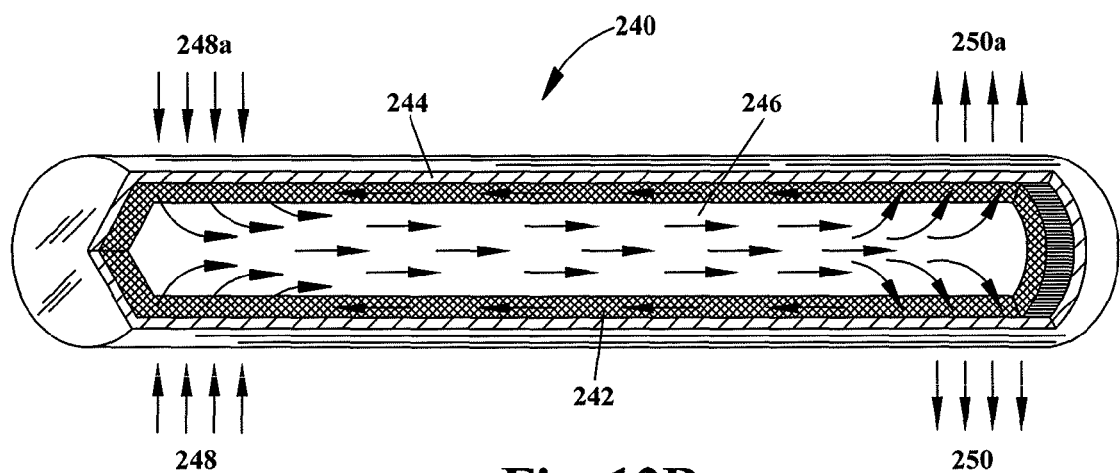
FIG. 13B illustrates the thermal pin located within the heat sink of the reform cooling assembly shown in FIG. 13A.

Two exemplary embodiments of the reform cooling assembly 230 of the present invention are illustrated in the drawings. Other embodiments would be apparent to the skilled artisan. FIGS. 13A and 13B illustrate the first embodiment. FIG. 13A is a front view of the reform cooling assembly 230 used to retrofit the refurbishing machine 100, including a mounting adapter 232, a heat sink 234, a support 236 housing a Peltier thermoelectric cooler 238, and the cooled forming die 30.

The mounting adapter 232 connects the reform cooling assembly 230 to the refurbishing machine 100. The heat sink 234 is a metal (preferably copper) block that facilitates heat transfer from the Peltier thermoelectric cooler 238 and, ultimately, away from the forming die 30. The support 236 houses the Peltier thermoelectric cooler 238, supports the heat sink 234, and sits atop the forming die 30. The forming die 30 should be maintained at relatively low temperature. An optional fan (not shown) can be included in the reform cooling assembly 230 to promote convection.

More specifically, the forming die 30 must be maintained at a temperature below the set point of the plastic used to form the container 50. (The "set point" is defined as the temperature below which the plastic is sufficiently soft to be distorted easily.) The temperature of the forming die 30 may be, but is not required to be, room temperature (72° F.) or below. Colder temperatures allow faster cycle times (within reason). The Peltier thermoelectric cooler 238 allows the operator to cool (or heat) the forming die 30 to a pre-determined temperature. (By "predetermined" is meant determined beforehand, so that the predetermined temperature must be determined, i.e., chosen or at least known, before the reforming process begins.) By reversing its DC power polarity, the Peltier thermoelectric cooler 238 transitions from a cooler to a heater. Tighter control of the temperature of the forming die 30 yields a better Process Capability Index (Cpk). Cpk is an index (a simple number) which measures how close a process is running to its specification limits, relative to the natural variability of the process.

The material of the heat sink 234 is selected to remove efficiently and quickly the heat generated by the Peltier thermoelectric cooler 238. Inside the heat sink 234 are one or more thermal pins 240 (see FIG. 13B). The thermal pin 240 removes heat from the Peltier thermoelectric cooler 238 and delivers that heat to the heat sink 234 as quickly as possible.

Turning to FIG. 13B, the thermal pin 240 is illustrated in partial cross-section. The thermal pin 240 has a wick 242 that separates a liquid 244 and a vapor 246. Heat 248a is delivered to the thermal pin 240 at an evaporator section 248, and heat 250a is removed from the thermal pin 240 at a condenser section 250. The thermal pin 240 is designed to transfer the heat to all areas of the thermal pin 240. This heat can then be removed (i.e., absorbed) from the thermal pin 240 through the heat sink 234.

Figure 14A:
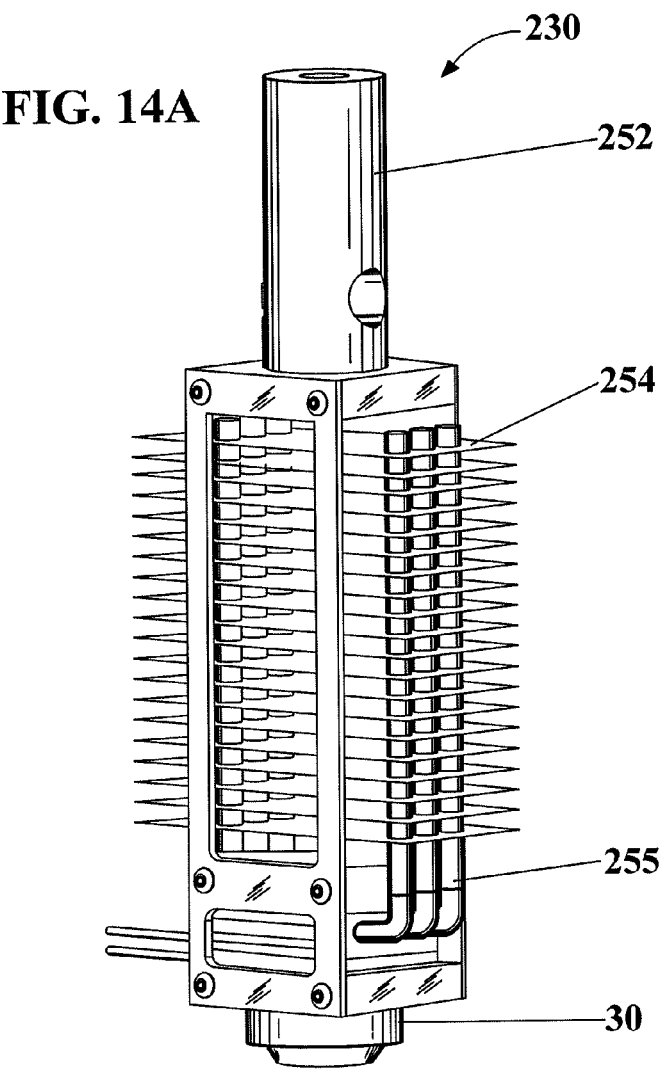
FIG. 14A is a perspective view of a second embodiment of the reform cooling assembly used to retrofit the refurbishing machine and create the reforming apparatus according to the present invention.
Figure 14B:
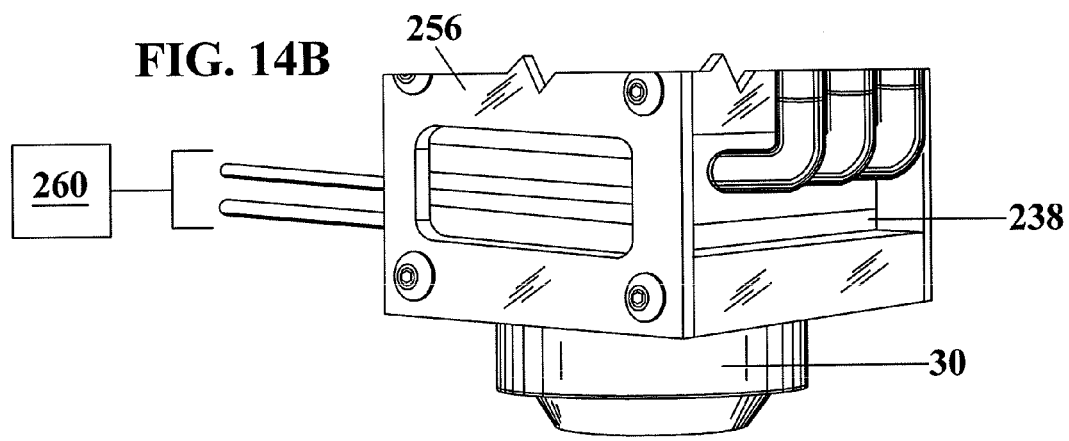
FIG. 14B highlights the Peltier thermoelectric cooler, used to cool the finishing tool, of the reform cooling assembly illustrated in FIG. 14A.

FIGS. 14A and 14B illustrate a second embodiment of the reform cooling assembly 230 of the present invention. FIG.

14A is a perspective view of the second embodiment, which includes a mounting post 252 connecting the reform cooling assembly 230 to the refurbishing machine 100. A heat sink 254 is provided with heat pipes 255. The Peltier thermoelectric cooler 238 is located just below the heat sink 254 and above the forming die 30. A thermocouple (not shown) is located in the top of the forming die 30.

FIG. 14B highlights the Peltier thermoelectric cooler 238, used to cool the forming die 30, of the reform cooling assembly 230 illustrated in FIG. 14A. The Peltier thermoelectric cooler 238 is connected to and powered by the temperature PID controller 260 that already exists on the refurbishing machine 100. Compression springs (not shown) located in the housing 256 hold the base of the heat sink 254 against the Peltier thermoelectric cooler 238. The springs maintain contact between the heat sink 254 and the Peltier thermoelectric cooler 238 as the reform cooling assembly 230 expands and contracts due to temperature changes.

The Peltier thermoelectric cooler 238 is a widely available component. Peltier devices are commonly used to cool a variety of components. Thermoelectric cooling uses the Peltier effect to create a heat flux between the junction of two different types of materials. A Peltier cooler transfers heat from one side of the device to the other side against the temperature gradient, from cold to hot, with consumption of electrical energy.

Simply connecting the Peltier thermoelectric cooler 238 to a DC power supply will cause one side to cool, while the other side warms. In the application of the subject invention, the Peltier thermoelectric cooler 238 is connected to and powered by the temperature PID controller 260 that already exists on the refurbishing machine 100. (Typically, the PID controller 260 operates using AC power; therefore, an AC-DC converter may be necessary to connect the Peltier thermoelectric cooler 238 to the PID controller 260.) In essence, the Peltier thermoelectric cooler 238 uses electricity to pump heat from the forming die 30 into the heat sink 234, 254. The effectiveness of the Peltier thermoelectric cooler 238 (i.e., the pump) at moving heat away from its cold side depends upon the amount of electric current provided and how well the heat can be removed from the hot side. The temperature of the forming die 30 is controlled by the existing PID controller 260; the PID controller 260 turns the power on and off to the Peltier thermoelectric cooler 238.

To complete retrofitting of the refurbishing machine 100 and create the reforming apparatus 200, the cooled forming die 30 may require a small power supply to be mounted at each spindle assembly 166 on the refurbishing machine 100. The performance of the reform cooling assembly 230 can be enhanced by custom-designing the heat sink 234 and by carefully selecting the materials of construction for the various components of the reform cooling assembly 230.

One advantage of the reforming apparatus 200 is that it uses the existing equipment utilities (e.g., the PID controllers 260 and electrical hookups) of the refurbishing machine 100 for the reform heating and cooling processes. The reforming apparatus 200 does not require the addition of cooling water or induction equipment to the refurbishing machine 100. This advantage allows the refurbishing machine 100 to be retrofit in the field with minimal down time and expense. The retrofit change over from refurbishing to reforming technologies consists, as described above, of removing old tooling and installing new tooling. In addition, the minimal component replacement may permit the owner of the reforming apparatus 200 to retain the benefit of any product warranty applicable to the refurbishing machine 100, i.e., the manufacturer's warranty on the refurbishing machine 100 may not be void.

D. The Application of Induction Heating

As discussed above, the present invention incorporates principles of induction heating. Induction heating is a method of providing fast, consistent heat for manufacturing applications which involve changing the properties of metals or other electrically conductive materials. The process relies on induced electrical currents within the material to produce heat. Although the basic principles of induction are well known, modern advances in solid state technology have made induction heating a remarkably simple, cost-effective method for applications which involve heating. See generally the website www.ameritherm.com of Ameritherm Inc. of Scottsville, N.Y., USA.

Using induction heating, an electrically conducting object (usually a metal) can be heated by electromagnetic induction. Two separate heating processes can come into play: eddy currents and magnetic hysteresis. Eddy currents are generated within the metal and resistance leads to Joule heating of the metal. An induction heater (for any process) consists of an electromagnet, through which a high-frequency AC is passed. Heat may also be generated by magnetic hysteresis losses in materials that have significant relative permeability. The frequency of the AC used depends on the object size, material type, coupling (between the induction coil and the object to be heated), and the penetration depth. Iron and its alloys respond best to induction heating, due to their ferromagnetic nature. Eddy currents can be generated in any conductor, however, and magnetic hysteresis can occur in any magnetic material.

Figure 15:
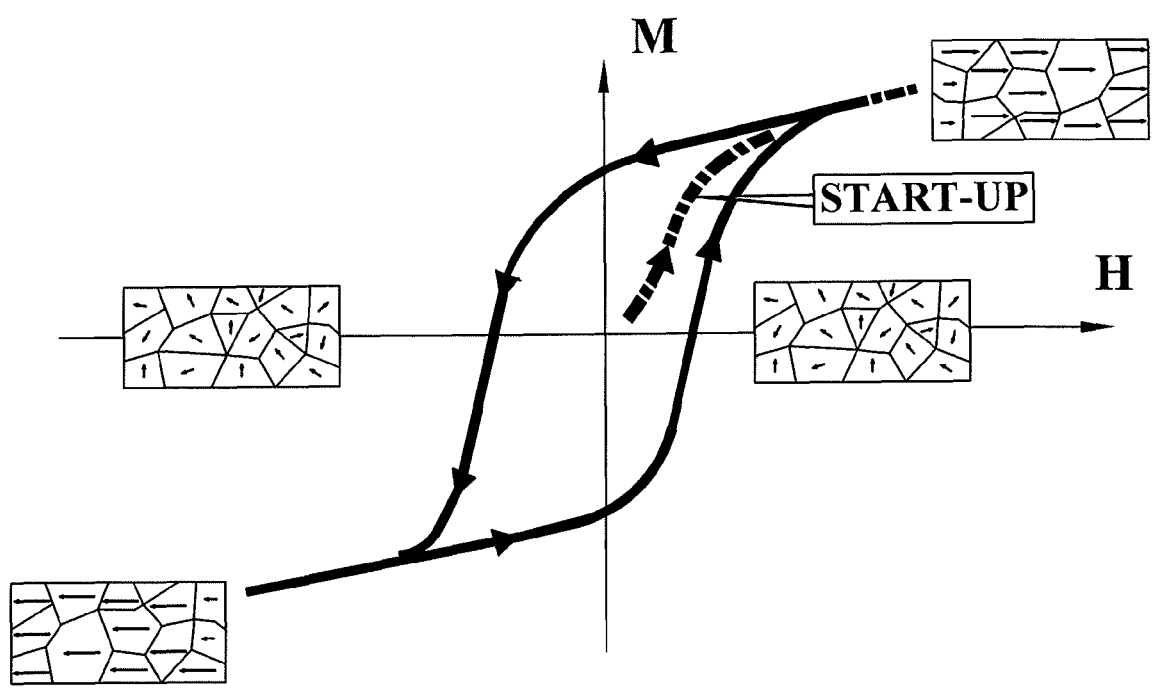
FIG. 15 illustrates the principle of magnetic hysteresis induction heating incorporated in the present invention.

The principle of magnetic hysteresis induction heating is illustrated in FIG. 15. FIG. 15 is a graph with the magnetization of the material (M) along the ordinate (vertical or "Y") axis and the applied magnetic field intensity (H) along the abscissa (horizontal or "X") axis. As shown by the boxes disposed along the H-axis, the electrons (represented by arrows) are randomly oriented absent imposition of a magnetic field. Upon start up, an induction field (magnetic field) emits a positive charge which forces positively charged electrons away from the field (see the oriented electrons in the top-right box of FIG. 15). Upon reversal of the induction field to a negative charge, at the bottom left of the graph, the positively charged electrons are attracted toward the field (see the oriented electrons in the bottom-left box of FIG. 15). By continuously changing the charge of the induction field (positive and negative), the movement of the electrons (from being pushed and pulled) causes friction heating at an atomic level. The loop depicted by the graph and formed by the reversal of field is the hysteresis loop.

The basic components of an induction heating system are an AC power supply (incorporated in the induction workhead 62), an induction coil 60, and a workpiece 46. The power supply of the induction workhead 62 sends alternating current through the induction coil 62, generating a magnetic field. The AC power supply provides electricity with low voltage but very high current and high frequency. When the workpiece 46 is placed in the induction coil 60, which is driven by the power supply, the magnetic field induces eddy currents in the workpiece 46, generating precise amounts of clean, localized heat without any physical contact between the induction coil 60 and the workpiece 46.

There is a relationship between the frequency of the magnetic field and the depth to which it penetrates the workpiece 46. Low frequencies (5-30 kHz) are effective for thicker workpiece materials requiring deep heat penetration; higher frequencies (100 to 400 kHz) are effective for smaller workpiece materials or shallow penetration; and the highest frequencies (e.g., 480 kHz) are effective for microscopic workpiece materials. The higher the frequency, the higher is the heat rate.

Figure 16A:
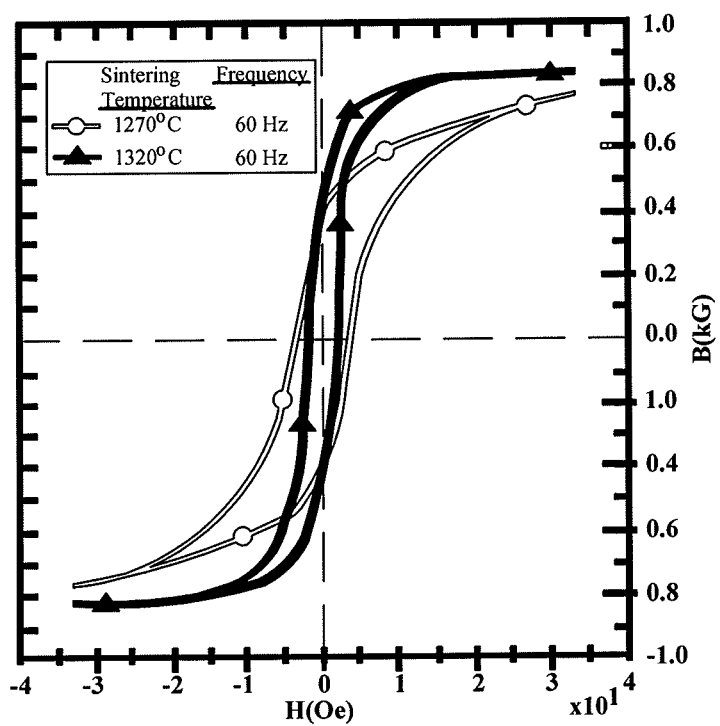
FIGS. 16A and 16B show the affects of different induction frequencies on a magnetic object subjected to the induction (magnetic) field.
Figure 16B:
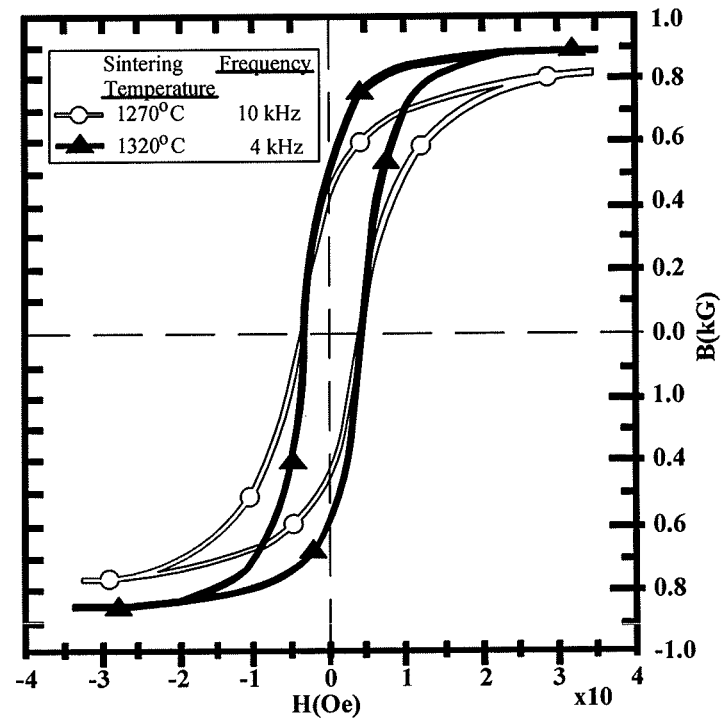

FIGS. 16A and 16B show the affects of different induction frequencies on a magnetic object subjected to the induction (magnetic) field. The total area within the hysteresis loop represents the amount of energy (heat) that is absorbed by the object (e.g., the workpiece 46). By optimizing the induction field frequency, the amount of heat that goes into the workpiece 46 can be increased. The result is a reduction in warm-up time, permitting use of a smaller induction workhead 62 and reducing cost.

Due to the effects of hysteresis, magnetic materials are easier to heat than non-magnetic materials via induction heating. Magnetic materials naturally resist the rapidly changing magnetic fields within the induction coil 60. The resulting friction produces hysteresis heating in addition to eddy current heating. A metal which offers high resistance is said to have high magnetic permeability which can vary from 100 to 500 for magnetic materials; non-magnetic materials have a permeability of 1.

Figure 17:
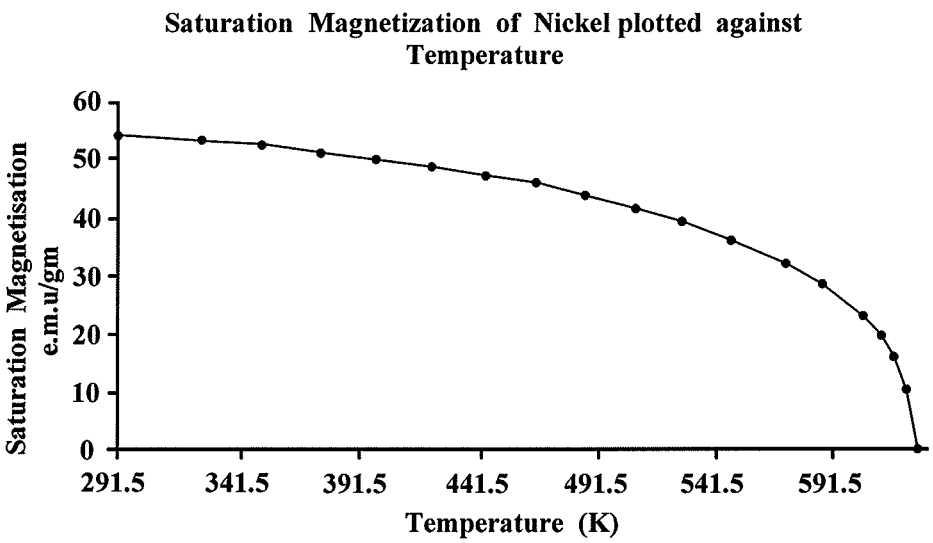
FIG. 17 illustrates how the magnetic characteristic of an example material (nickel) approaches zero (non-magnetic) as it increases in temperature.
Figure 18:
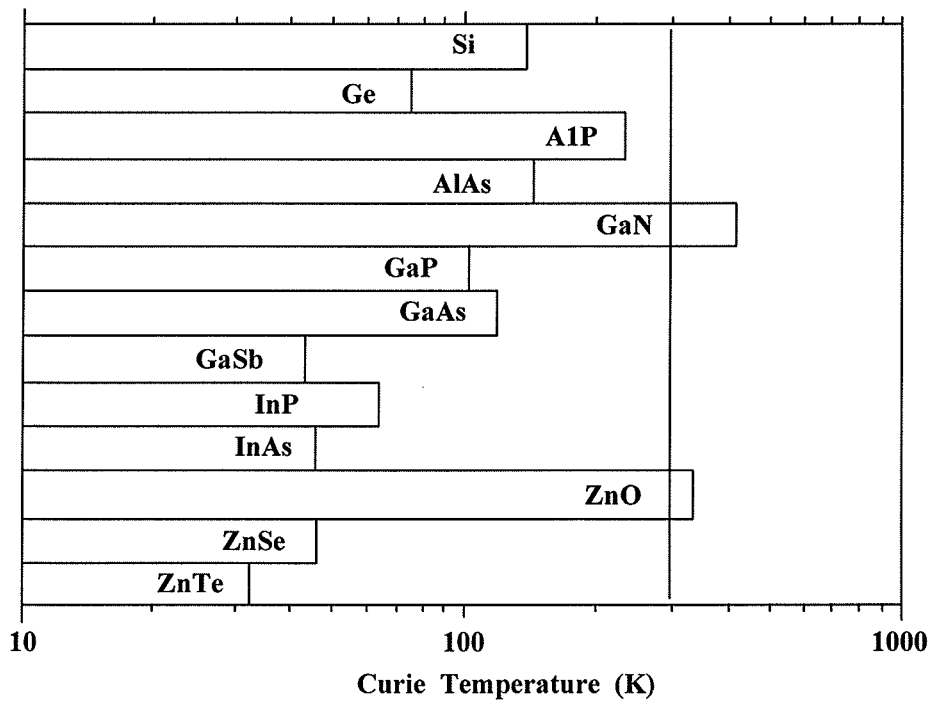
FIG. 18 shows that different materials have different Curie points.

FIG. 17 illustrates how the magnetic characteristic of an example material (nickel) approaches zero (non-magnetic) as it increases in temperature. The temperature at which a magnetic material loses its magnetic properties and becomes non-magnetic is known as the "Curie" point of the material. Hysteresis heating occurs at temperatures below the "Curie" point of the material. FIG. 18 shows that different materials have different Curie points. By selecting for the workpiece 46 a material with a high Curie point, the cycle time of the reformation process of the present invention can be reduced. (Of course, this is true up to a specific temperature determined by the plastic material being heated; once above this temperature the material may catch fire rather then soften.)

The induced current flow within the workpiece 46 is most intense on the surface, and decays rapidly below the surface. Thus, the outside will heat more quickly than the inside; about 80% of the heat produced in the workpiece 46 is produced in the outer "skin." This is described as the "skin depth" of the workpiece 46. The skin depth decreases when resistivity decreases, permeability increases, or frequency increases.

In summary, high permeability and temperatures below the Curie temperature in the workpiece 46 are useful. Temperature difference, mass, and specific heat also influence the heating of the workpiece 46. The energy transfer of induction heating is coupled to the distance between the induction coil 60 and the workpiece 46. Energy losses occur through heat conduction from the workpiece 46 to the workpiece support 40, natural convection, and thermal radiation. Among the characteristics that must be considered for a particular application are: the degree of temperature change required; the mass, specific heat, and electrical properties of the workpiece 46; the coupling efficiency of the design of the induction coil 60; and thermal losses due to conduction of heat into the workpiece support 40, convection, and radiation.

A wide range of materials may be suitable to form the workpiece 46 depending upon a particular application. Iron is one suitable material. It might also be possible, in some applications, to create a hybrid or composite workpiece 46: a plastic or ceramic workpiece 46 having a band or core of a metal such as iron.

Although illustrated and described above with reference to certain specific embodiments and examples, the present invention is nevertheless not intended to be limited to the details shown. Rather, various modifications may be made in the details within the scope and range of equivalents of the claims and without departing from the spirit of the invention. It is expressly intended, for example, that all ranges broadly recited in this document include within their scope all narrower ranges which fall within the broader ranges.

What is claimed:

1. An apparatus for reforming a portion of a plastic container using induction heating, comprising a reform heating assembly comprising
    a mount adapted to engage a frame; and
    an insulated body fastened to the mount and having a body, a top, and a centrally disposed buttress extending from the top, and housing a heat dispersion block having a groove into which is disposed an induction heater comprising a thermocouple connector and a power connector, and heated to a temperature above about 500 degrees F. and heating the portion of the plastic container to be reformed without contacting the container; and
    a reform cooling assembly comprising a forming die maintained at a temperature below the set point of the plastic used to form the container and adapted to contact and reform the portion of the container, a support that houses a Peltier thermoelectric cooler above the forming die and, a heat sink above the support for removing heat from the Peltier thermoelectric cooler.

2. The apparatus of claim 1, further comprising a cover plate engaging the heat dispersion block to form a single, monolithic unit and sandwich the induction heater within the groove.

3. The apparatus of claim 1, wherein an air gap exists between the top of the insulated body and the heat dispersion block on either side of the buttress and between the body of the insulated body and the heat dispersion block.

4. The apparatus of claim 1 wherein the insulated body has an information-providing color.

5. The apparatus of claim 1, wherein the reform cooling assembly is operably connected to a proportional-integral-derivative (PID) controller that controls the Peltier thermoelectric cooler to maintain the forming die at the temperature below the set point of the plastic used to form the container.

6. The apparatus of claim 1, wherein the mount has an aperture in communication with a central passage for routing connections that connect with the power connector and the thermocouple connector through the mount.

7. The apparatus of claim 1, wherein the groove of the heat dispersion block is a helical or spiral groove.

8. The apparatus of claim 1, wherein an air gap exists between the body of the insulated body and the heat dispersion block.

9. The apparatus of claim 1, wherein the insulated body has a side hole adapted to route connections through the insulated body.

10. The apparatus of claim 1, wherein the reform heating assembly has a lower heated surface located proximate the portion of the container to be reformed, and the lower heated surface is heated to a temperature between approximately 1,200 to 1,400° F.

11. The apparatus of claim 1, wherein the heat sink comprises one or more thermal pins for removing heat from the Peltier thermoelectric cooler.

12. The apparatus of claim 1, wherein the heat sink comprises a plurality of heat pipes.

13. An apparatus for reforming a portion of a plastic container using induction heating, the apparatus comprising:
    a reform heating assembly including a mount adapted to engage a frame; an insulated body fastened to the mount and having a body, a top, and a centrally disposed buttress extending from the top, and housing a heat dispersion block having a groove into which is disposed an induction heater comprising a first thermocouple connector and a first power connector operably connected to a first proportional-integral derivative (PID) controller and, heated to a temperature above 500 degrees F. and heating the portion of the plastic container to be reformed without contacting the container and a reform cooling assembly having a forming die maintained at a temperature below the set temperature of the plastic used to form the container and adapted to contact and reform the portion of the container, a support housing a Peltier thermoelectric cooler comprising a second thermocouple connector and a second power connector operably connected to a second PID controller that controls the Peltier thermoelectric cooler to maintain the forming die at the temperature below the set point of the plastic used to form the container, and a heat sink facilitating heat transfer away from the forming die.

14. The apparatus of claim 13, further comprising a cover plate engaging the heat dispersion block to form a single, monolithic unit and sandwich the induction heater, the first power connector, and the first thermocouple connector within the groove.

15. The apparatus of claim 13, wherein an air gap exists between the top of the insulated body and the heat dispersion block on either side of the buttress and between the body of the insulated body and the heat dispersion block.

16. The apparatus of claim 13 wherein the insulated body has an information-providing color.

17. The apparatus of claim 13, wherein the groove of the heat dispersion block is a helical or spiral groove.

18. The apparatus of claim 13 wherein an air gap exists between the body of the insulated body and the heat dispersion block.

19. The apparatus of claim 13, wherein the heat sink comprises one or more thermal pins for removing heat from the Peltier thermoelectric cooler.

20. The apparatus of claim 13, wherein the heat sink comprises a plurality of heat pipes.

21. An apparatus for reforming a portion of a plastic container using induction heating, the apparatus comprising:
a reform heating assembly including a mount adapted to engage a frame, an insulated body having a body, a top, and a centrally disposed buttress extending from the top and housing a heat dispersion block having a groove into which is disposed an induction heater comprising a first thermocouple connector and a first power connector operably connected to a first proportional-integral derivative (PID) controller and, heated to a temperature above 500 degrees F. and heating the portion of the plastic container to be reformed without contacting the container, a cover plate engaging the heat dispersion block to form a single monolithic unit and sandwich the induction heater, the first power connector, and the first thermocouple connector within the groove, an air gap between the top of the insulated body and the heat dispersion block on either side of the buttress and between the body of the insulated body and the heat dispersion block and
a reform cooling assembly having a forming die maintained at a temperature below the set temperature of the plastic used to form the container and adapted to contact and reform the portion of the container, a support housing a Peltier thermoelectric cooler comprising a second thermocouple connector and a second power connector operably connected to a second PID controller that controls the Peltier thermoelectric cooler to maintain the forming die at the temperature below the set point of the plastic used to form the container and, a heat sink facilitating heat transfer away from the forming die.

22. The apparatus of claim 21, wherein the heat sink comprises one or more thermal pins for removing heat from the Peltier thermoelectric cooler.

23. The apparatus of claim 21, wherein the heat sink comprises a plurality of heat pipes.

* * * * *